(12) United States Patent
Lee et al.

(10) Patent No.: US 8,245,938 B2
(45) Date of Patent: Aug. 21, 2012

(54) METHOD FOR PROVIDING MOBILE SERVICE USING CODE-PATTERN

(75) Inventors: Jae-Jun Lee, Seoul (KR); Young-Jun Shin, Seoul (KR)

(73) Assignee: KT Corporation, Seongnam (KR)

( * ) Notice: Subject to any disclaimer, the term of this patent is extended or adjusted under 35 U.S.C. 154(b) by 1100 days.

(21) Appl. No.: 12/140,930

(22) Filed: Jun. 17, 2008

(65) Prior Publication Data

US 2008/0247363 A1    Oct. 9, 2008

Related U.S. Application Data

(60) Division of application No. 11/221,301, filed on Sep. 6, 2005, now Pat. No. 7,419,097, which is a continuation of application No. PCT/KR2004/000481, filed on Mar. 8, 2004.

(30) Foreign Application Priority Data

| Mar. 7, 2003 | (KR) | 10-2003-0014419 |
| Mar. 7, 2003 | (KR) | 10-2003-0014420 |
| Mar. 8, 2003 | (KR) | 10-2003-0014598 |
| Mar. 20, 2003 | (KR) | 10-2003-0017468 |
| Mar. 20, 2003 | (KR) | 10-2003-0017469 |

(51) Int. Cl.
*G06K 7/10* (2006.01)
(52) U.S. Cl. ......... 235/462.46; 235/462.11; 235/462.45; 379/910
(58) Field of Classification Search ............. 235/462.46, 235/462.11, 462.45; 379/910; 455/41.2; 340/994
See application file for complete search history.

(56) References Cited

U.S. PATENT DOCUMENTS

| 6,199,048 | B1 | 3/2001 | Hudetz et al. |
| 6,456,207 | B1 * | 9/2002 | Yen ............................... 340/994 |
| 6,654,768 | B2 | 11/2003 | Celik |
| 2002/0026500 | A1 | 2/2002 | Kanefsky et al. |
| 2002/0035503 | A1 | 3/2002 | Matsumoto |
| 2002/0090132 | A1 | 7/2002 | Boncyk et al. |
| 2002/0126780 | A1 | 9/2002 | Oshima et al. |
| 2002/0195495 | A1 | 12/2002 | Melick et al. |

(Continued)

FOREIGN PATENT DOCUMENTS

CN    1270364    10/2000

(Continued)

OTHER PUBLICATIONS

Chinese Office Action—Application No. 200480005625.1—Date of Notification Jun. 8, 2007.

(Continued)

*Primary Examiner* — Kristy A Haupt
(74) *Attorney, Agent, or Firm* — Sughrue Mion, PLLC

(57) ABSTRACT

A method and apparatus for providing a mobile service with the use of a code pattern is disclosed In one embodiment, the method comprising: taking a photograph of a code pattern image, decoding the photographed code pattern image so as to obtain code information, extracting uniform resource locator (URL) information corresponding to the code information, transmitting a content information request message to a service provider server corresponding to the URL information, and receiving content information corresponding to the URL information from the service provider server. According to embodiments of the present invention, it is possible to provide various and convenient mobile services to mobile terminal users using a mobile terminal, having a camera, and a code pattern containing the URL information.

19 Claims, 34 Drawing Sheets

U.S. PATENT DOCUMENTS

| | | | |
|---|---|---|---|
| 2003/0120555 | A1 | 6/2003 | Kitagawa |
| 2003/0149557 | A1 | 8/2003 | Cox et al. |
| 2005/0227620 | A1* | 10/2005 | Morimoto .................. 455/41.2 |

FOREIGN PATENT DOCUMENTS

| | | |
|---|---|---|
| CN | 1313554 | 9/2001 |
| EP | 1 033 656 A1 | 9/2000 |
| JP | 1998-105889 | 4/1998 |
| JP | 2000-057079 | 2/2000 |
| JP | 2001-319186 | 11/2001 |
| JP | 2002-077994 | 3/2002 |
| JP | 2002-111909 | 4/2002 |
| JP | 2002-181581 | 6/2002 |
| KR | 10 2001 0081414 A | 8/2001 |
| KR | 10 2001 0094453 A | 11/2001 |
| KR | 10 2001 0103905 A | 11/2001 |
| KR | 10 2001 0106280 A | 11/2001 |
| KR | 10 2001 0112662 A | 12/2001 |
| KR | 10 2002 0064097 A | 8/2002 |
| KR | 10 2002 0070669 A | 9/2002 |
| KR | 10 2002 0094437 A | 12/2002 |
| KR | 0414523 | 1/2004 |

OTHER PUBLICATIONS

Notification of the Second Office Action for Chinese Application No. 200480005625.1 issued by the State Intellectual Property Office of the People's Republic of China on Feb. 1, 2008.

Jinling Chen, "GSM mobile Phone Message and Information Request Operation" Mobile Communication, Post and Communication Business Information, No. 20, Oct. 31, 1999.

International Search Report for International Application No. PCT/KR2004/000481 issued by Korean Intellectual Property Office on Jun. 11, 2004.

An Office Action for U.S. Appl. No. 12/140,960 dated Aug. 3, 2009 by the United States Patent and Trademark Office.

Office Action for Korean Patent application No. 10-2003-0017468 dated Mar. 3, 2010 by Korean Intellectual Property Office.

* cited by examiner

METHOD FOR PROVIDING MOBILE SERVICE USING CODE-PATTERN

CROSS-REFERENCE TO RELATED APPLICATIONS

This application claims priority to and is a divisional of U.S. application Ser. No. 11/221,301, filed Sep. 6, 2005 which is a continuation application, and claims the benefit under 35 U.S.C. §§120 and 365 of PCT Application No. PCT/KR2004/000481, filed on Mar. 8, 2004 and published on Sep. 16, 2004, in English, which is hereby incorporated by reference.

BACKGROUND OF THE INVENTION

1. Field of the Invention

The present invention relates to a system and a method for providing mobile services using a code pattern, and specifically, to a system and a method for providing mobile services, for example, a content providing service, a geographical information providing service, a product information providing service, a taxi call service, a personal contact information providing service, a payment service etc, using the code pattern.

2. Description of the Related Technology

Recently, mobile terminals have been widely used and mobile communication technologies are also being rapidly developed. Further, various mobile services using mobile terminals are being developed. However, there are still needs for a new mobile service to provide various content more conveniently and to allow users to use various services more easily.

Now, it has been common that companies, which have their own websites, provide their URL information along with product information in advertising their products in a newspaper, magazine or catalog. This can be an effective marketing method over a conventional advertisement method, which does not provide such website information, in that customers can visit the websites and obtain more information about the products that they are considering purchasing.

However, in reality, it is less likely that a person, who reads the advertisement having the URL information, remembers or writes down the URL, and visits the internet site and buys the product from the website since it is not convenient to memorize the website address. So, there has been a need to effectively induce a person who reads the advertisement having website information to actually buy the product.

Travelers carry a guidebook when they travel. But, due to a limited space, guidebooks generally do not provide detailed and helpful information. Particularly, when those books contain certain foreign language information, travelers usually do not find those books very helpful.

Furthermore, when travelers try to visit, e.g., a specific building, certain publicly available directions, for example, shown at a subway station, to the building, may not be sufficient for them to find the place. Thus, there has been a demand for conveniently providing sufficient travel information to travelers.

Recently, according to the development of mobile communication technology and the spread of mobile terminals, a transportation calling service using a mobile terminal is being used. However, a user cannot use this service if he does not know the telephone number of a calling service company. Even if a user (traveler) knows the contact information, he may have difficulty in explaining his location if he is a stranger in that area. Thus, there has been a demand for conveniently providing a taxi calling service with the use of a mobile terminal.

Meanwhile, a bar code has been extensively used in many places, such as retail stores and book stores. Recently, a business card, containing a bar code for, e.g., telephone number, has been developed. The bar code can be used to call or store the telephone number in a mobile terminal. However, to do so, a bar code reader is required to be either embedded in or connected to a mobile terminal.

Korean patent No. 0414523 discloses "apparatus and method of acquiring data through codes to be extracted from the pattern." This patent relates to obtaining certain information from a code pattern.

SUMMARY OF CERTAIN INVENTIVE ASPECTS

One aspect of the present invention provides a method and apparatus for providing content by using a code pattern where a mobile terminal reads the code pattern (barcode) having prescribed information and is connected to internet site or server according to the information recorded in a barcode and can get a desired content conveniently.

Another aspect of the present invention provides a method and apparatus for providing a taxi call service with the use of a code pattern, for the purpose of allowing a user to call a taxi easily although he does not know the telephone number or a web site address.

Another aspect of the present invention provides a method and apparatus for providing personal connection information by using a code pattern, for the purpose of conveniently obtaining the contact information of others by using a code pattern.

Another aspect of the present invention provides a method and apparatus for payment by using a code pattern, for the purpose of paying bills conveniently through the Internet so that there is no need to use a paper bill (giro) through paying the bill by using a code pattern.

Another aspect of the present invention provides a method of providing a content using a code pattern in a user terminal, the method comprising: taking a photograph of a code pattern image, decoding the photographed code pattern image to obtain code information, extracting URL information corresponding to the code information, transmitting a content information request message to a service provider server corresponding to the URL information, and receiving content information corresponding to the URL information from the service provider server.

Another aspect of the present invention provides a method of providing a content using a code pattern in a user terminal, the method comprising: taking a photograph of a code pattern image in which URL information of the web page is recorded, transmitting a content information request message including the photographed code pattern image to a service provider server, receiving a web page content including the content information from the service provider server, wherein the service provider server analyzes the code pattern image to obtain code information corresponding to the code pattern image and extract the web page corresponding to the code information.

Another aspect of the present invention provides a method of providing a content using a code pattern in a service provider server, the method comprising: generating code information corresponding to web page address information including predetermined content information, generating a code pattern image corresponding to the code information, receiving a content information request message from a user terminal, wherein the user terminal comprises a decoder for decoding the code pattern image, and the user terminal takes photograph the code pattern image and decodes the photographed code pattern image to obtain the web page address information including the content information to connect the service provider server, and obtaining web page content including the content information corresponding to the code information and transmitting the web page content to the user terminal.

Another aspect of the present invention provides a method of providing a content using a code pattern, the method comprising: taking a photograph of a code pattern image by a camera installed in a mobile terminal, transmitting a content information request message including the photographed code pattern image to a service provider server, by the mobile terminal, and analyzing the code pattern image to obtain code information, by the service provider server, analyzing the code information to obtain at least one web page information corresponding the code information, by the service provider server, and transmitting the obtained web page information to the mobile terminal, by the service provider server.

Another aspect of the present invention provides a method of providing a transportation call service using a code pattern, the method comprising: receiving a transport call message including code information obtained by analyzing a code pattern installed at one side of a specific region, from a user terminal, wherein the code pattern includes a service identifier for indicating a service type and location information about the specific region, obtaining the service identifier and the location information about the specific region from the code information included in the received taxi call message, and obtaining information about at least one transportation service provider server corresponding to the service identifier to transmit the taxi call message including the location information about the specific region to the transportation service provider server, wherein the transportation service provider server detects present location information of transport terminal belonged to the transportation service provider and transmits the taxi call message to a transport terminal which is the nearest from the specific region.

Another aspect of the present invention provides a method of providing a transportation call service using a code pattern, the method comprising: receiving a transportation call message including code information obtained by analyzing a code pattern installed at one side of a specific region, from a user terminal, wherein the code pattern comprises service identifier for indicating a service type and location information about the specific region, obtaining the service identifier and the location information about the specific region from the code information belonged to a taxi call message, obtaining present location information of transport terminals located in a predetermined distance from the specific region, and detecting the nearest transport terminal from the specific region and transmitting the transport terminal call message to the transport terminal.

Another aspect of the present invention provides a method of providing a transportation call service using a code pattern, the method comprising: receiving a transportation call message including code information obtained by analyzing a code pattern installed at one side of a specific region, from a user terminal, wherein the code pattern comprises a service identifier for indicating a service type and location information about the specific region, analyzing the service identifier included in a transport call message and recognizing that the service type is a transportation call service, obtaining location information for the specific region location and information about transportation service provider server corresponding to the code information included in the received transport call message, and transmitting the location information for the specific region and the information about transportation service provider server to the user terminal, wherein if the user terminal transmits transport call message including the location information for the specific region to the transportation service provider server, the transportation service provider server detects present location information of transport terminal belonged to the transportation service provider and transmits the transport terminal call message to the nearest transport terminal from the specific region location.

Another aspect of the present invention provides a method of calling transportation using a code pattern in a user terminal, the method comprising: reading a code pattern installed at one side of a specific region to obtain code information, wherein the code pattern comprises location information for a specific region and information about a transportation service provider server, obtaining the location information for the specific region and the information about the transportation service provider server from the obtained code information, and transmitting transport terminal call message including the location information for the specific region to the transportation service provider server, wherein the transportation service provider server detects present location information of transport terminals belonged to the transportation service provider and transmits the transport terminal call message to the nearest transport terminal from the specific region location.

Another aspect of the present invention provides a method of calling transportation using code pattern in user terminal, the method comprising: reading a code pattern installed at one side of a specific region to obtain code information, wherein the code pattern comprises location information for a specific region and information about a transportation service provider server, transmitting the obtained code information to a service provider server, receiving location information for the specific region and information about the transportation service provider server corresponding to the code information, and transmitting transport terminal call message including the location information for the specific region to the transportation service provider server, wherein the transportation service provider server detects present location information of transport terminals belonged to the transportation service provider and transmits the terminal call message to the nearest transport terminal from the specific region location.

Another aspect of the present invention provides a method of providing personal contact information using a code pattern, the method comprising: receiving a code pattern issue request message including user contact information from a user terminal, generating code information corresponding to the user contact information, generating code pattern image corresponding to the code information, transmitting the generated code pattern image to the user terminal; receiving user contact information request message including the code information from a predetermined terminal, wherein the predetermined terminal includes a decoder for decoding code pattern and generates the code information by photographing the code pattern image and by decoding the photographed code pattern image; and transmitting user contact information corresponding to the code pattern to the predetermined terminal.

Another aspect of the present invention provides a method of providing personal contact information using code pattern, the method comprising: receiving a code pattern issue request message including user contact information from an agent's computer by a service provider server, generating code information corresponding to the user contact information by the service provider server, generating code pattern image corresponding to the code information by the service provider server, transmitting the generated code pattern image to the agent's computer by the service provider server; transmitting the code pattern image to business card imprint machine by the agent's computer in order that a business card having the code pattern is issued; receiving user contact information request message including the code information from a predetermined terminal, wherein the predetermined terminal includes a decoder for decoding code pattern and generates the code information by photographing the code pattern image and by decoding the photographed code pattern image, and transmitting user contact information corresponding to the code pattern to the predetermined terminal.

Another aspect of the present invention provides a method of providing personal contact information using a code pattern, the method comprising: receiving a code pattern issue request message including user contact information from a user terminal; generating code information corresponding to the user contact information, generating code pattern image corresponding to the code information, transmitting the generated code pattern image to the user terminal, receiving personal contact information request message including the code pattern image which is picture of code pattern written on business card from a predetermined terminal, and obtaining user contact information corresponding to the code pattern image to transmit to the predetermined terminal.

Another aspect of the present invention provides a method of obtaining personal contact information using a code pattern in a predetermined terminal, the method comprising: taking a photograph of a code pattern in which user contact information is stored, obtaining code information from the photographed code pattern image, transmitting user contact information request message including the obtained code information to a service provider server, receiving user contact information from the service provider server to display the user contact information on screen, and connecting to the received user contact information if contact command is input by a predetermined terminal' user.

Another aspect of the present invention provides a method of paying a bill using a code pattern in a user terminal, the method comprising: receiving a billing notice message from a service provider server, connecting to the service provider server based on the contact information which is included in the billing notice message, transmitting code pattern issue request message for getting code information in which user information and billing information are stored to the service provider server, and receiving code pattern image from the service provider server, wherein the service provider server generates code information including the user information and billing information and code pattern image corresponding to the code information.

Another aspect of the present invention provides a method of paying a bill using a code pattern in a user terminal, the method comprising: taking a photograph of a code pattern image installed at one side of a paper bill by a photographer in the user terminal, analyzing the code pattern image to obtain code information corresponding to the code pattern image, wherein the code information includes billing information and service provider information, analyzing the code information to obtain the billing information and the service provider information, transmitting payment request message including user information and the billing information to the service provider server corresponding to the obtained service provider information, and receiving payment completion message from the service provider server-after the service provider server transmits payment request message to billing server and receives payment completion message from the billing server.

Still another aspect of the present invention provides a method of paying a bill using code pattern in a billing system, the method comprising: detecting a code pattern image which is displayed on a terminal screen, analyzing the code pattern image to obtain code information corresponding to the code pattern image, obtaining user information and billing information which are included in the code information to transmit the user information and the billing information to a billing processing unit, obtaining payment method information to transmit the result to the billing processing unit, and processing payment transaction corresponding to the payment method information.

Still another aspect of the present invention provides a method of paying a bill using code pattern in a service provider server, the method comprising: receiving a code pattern issue request message from a terminal, obtaining billing information corresponding to the received user information, generating code information corresponding to the user information and the billing information; generating code pattern image corresponding to the code information, and transmitting the code pattern image to the terminal, wherein the code pattern image displayed on the terminal screen is read and procedure for paying the bill is processed by billing system.

Yet another aspect of the present invention provides a method of paying a bill using code pattern in a service provider server, the method comprising: receiving a payment request message including user information and billing information from a user terminal, wherein the user terminal includes a decoder for decoding the code pattern image, and the user terminal takes photograph the code pattern image and decodes the photographed code pattern image to obtain code information and then obtains information about a service provider' server to connect the service provider server, checking whether the transmitted user information and billing information are identical to the user information and billing information which are stored in billing database, and processing procedure for paying the bill, if the transmitted user information and billing information are identical to the user information and billing information which are stored in billing database.

Yet another aspect of the present invention provides a method of paying a bill using a code pattern in a service provider server, the method comprising: receiving a payment request message including a code pattern image from a user terminal, wherein the code pattern image includes billing information and is photographed by a photographing unit in the user terminal, analyzing the code pattern image to obtain code information corresponding to the code pattern image obtaining user information and billing information corresponding to the code information in reference of billing database, and processing procedure for paying the bill

BRIEF DESCRIPTION OF THE DRAWINGS

Embodiments of the present invention will be described with reference to the attached drawings.

DETAILED DESCRIPTION OF CERTAIN INVENTIVE EMBODIMENTS

Figure 1:
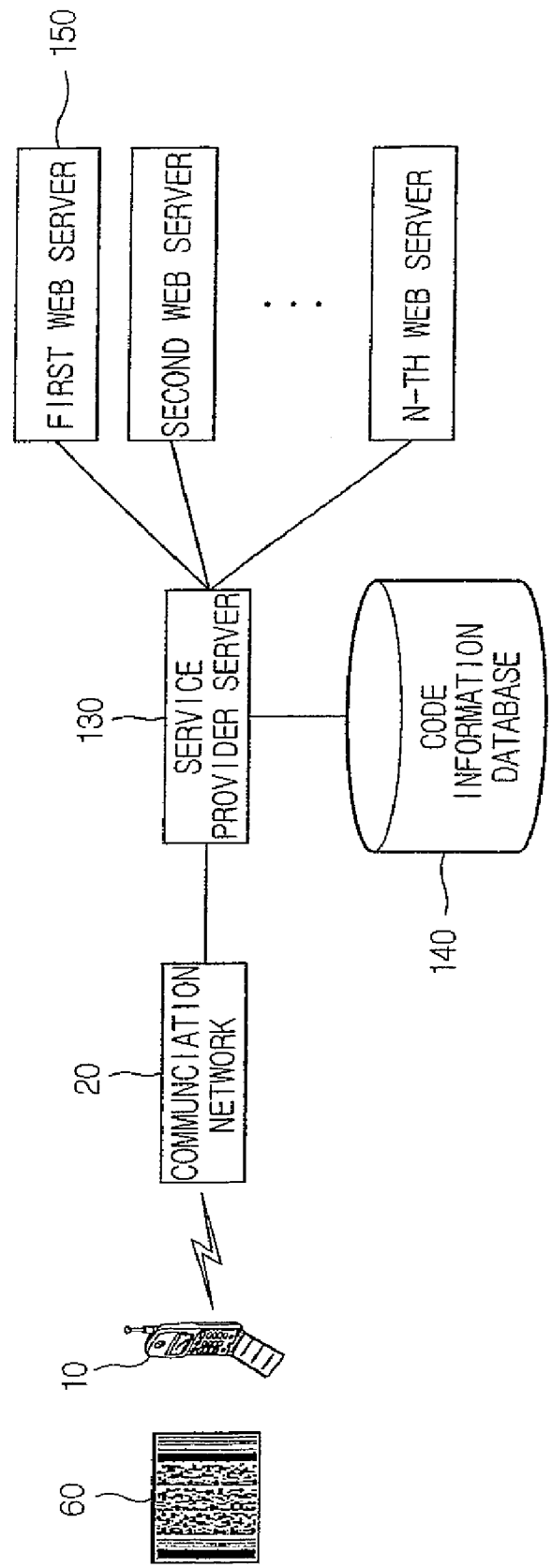
FIG. 1 is a view showing the construction of a content providing system using a barcode 60 according to one embodiment of the present invention.

Hereinafter, embodiments of the present invention will be described in detail with reference to the attached drawings. The same reference numerals are used throughout the different drawings to designate the same or similar components.

FIG. 1 is a view showing the construction of a content providing system using a barcode 60 according to one embodiment of the present invention.

As shown in FIG. 1, the content providing system using the barcode 60 according to the present invention comprises a user terminal 10, a service provider server 130 and a plurality of Web servers 150.

The user terminal 10, which is a mobile communication terminal connected to the service provider server 130 through a communication network 20 including a wireless communication network and a wired communication network, transmits and receives information to and from the service provider 130 through the communication network 20. A wireless communication terminal, such as a mobile phone, a Personal Communications Service (PCS) and a Personal Digital Assistant (PDA), can be used as the user terminal 10. The terminal 10 used in the present invention has a function of reading and decoding the barcode 60, so that the terminal 10 reads the barcode 60 printed on a printed matter, such as a newspaper or a magazine, extracts Uniform Resource Locator (URL) information recorded on the barcode 60 and accesses the service provider server 130, or extracts code information and transmits the extracted code information to the service provider 130 through the communication network 20. In this case, the URL information may be the numeric URL of a corresponding domain. The detailed construction of the user terminal 10 will be descried later with reference to FIG. 3. Further, a Personal Computer (PC) or a notebook computer, as well as a mobile terminal, can be used as the user terminal 10.

The service provider server 130 is a computer provided in a service provider that provides the content providing service of the present invention, and functions to extract corresponding content and transmit the content to the user terminal 10, or extract the information of a Web page, providing the corresponding content, and transmit the Web page information to the user terminal 10, if a content request message is received from the user terminal 10 through the communication network 20. In this case, the service provider server 130 may be the computer of a service provider independent of a communication service provider (not shown) that provides the communication network 20, or the computer of a communication service provider if the communication service provider personally provides the service using the communication network 20 and the computer thereof.

The Web server 150 is a computer provided in a service provider that has content related to information recorded on the barcode, and functions to extract Web page information corresponding to a Web page information request message received from the user terminal 10 and provide the Web page information to the user terminal 10. That is, the Web server 150 is used when the service provider server 130 has information on Web servers, including corresponding content, without personally providing the content providing service.

Figure 2:
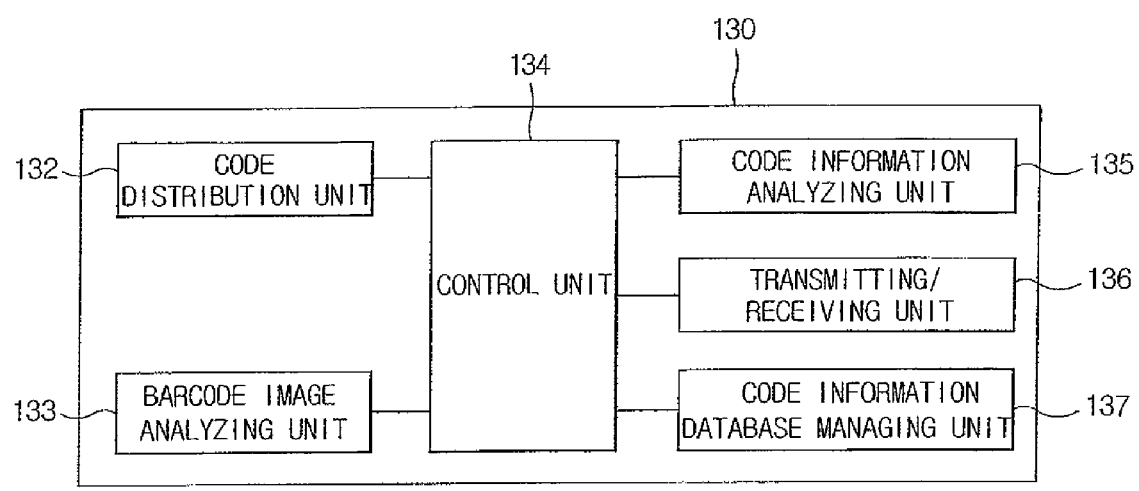
FIG. 2 is a block diagram showing the internal construction of the service provider server of FIG. 1.

FIG. 2 is a block diagram showing the internal construction of the service provider server 130 of FIG. 1. As shown in FIG. 2, the service provider server 130 includes a code distribution unit 132, a barcode image analyzing unit 133, a code information analyzing unit 135, a transmitting/receiving unit 136, a code information database managing unit 137 and a control unit 134.

The code distribution unit 132, which is adapted to analyze a service identifier 91 included in a content request message 90 received from the user terminal 10 and classify service types, analyzes the service identifier 91, recognizes that a service type is the content providing service, and transmits a received barcode image or code information to the barcode image transmitting unit 133 or the code information analyzing unit 135 according to embodiments.

The barcode image analyzing unit 133 is adapted to receive a barcode image photographed by a photographing unit (11 of FIG. 3), extract code information from the barcode image and transmit the code information to the code information analyzing unit 135 in a case where a decoder 13 for decoding the barcode 60 is not provided in the user terminal 10.

The code information analyzing unit 135 functions to analyze code information 95 received from the code distribution unit 132 or the barcode image analyzing unit 133 and extract the information of a Web page, including content information, from the analyzed code information. The code information analyzing unit 135 extracts the Web page information corresponding to the code information 95 with reference to the code information database 140 storing therein user contact information corresponding to the code information 95.

The transmitting/receiving unit 136 functions to receive the content information request message 90 from the user terminal 10, and transmit extracted content information or Web page information to the user terminal 10.

The code information database managing unit 137 functions to manage the code information database 137 storing therein the Web page information of a Web server 150 corresponding to the code information 95.

The control unit 134, which is adapted to control the respective components, generates control signals required to control the barcode image analyzing unit 133 and the code information analyzing unit 135, extracts content corresponding to the received content request message 90, and transmits the content to the transmitting/receiving unit 136.

Figure 3:
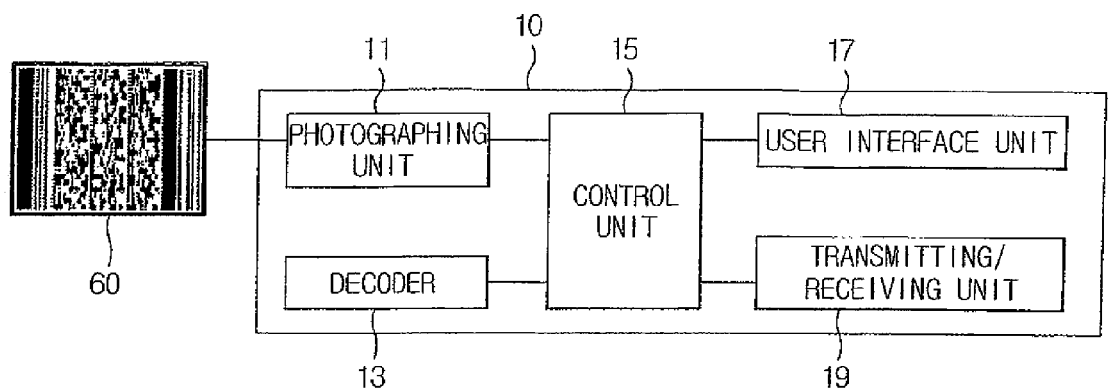
FIG. 3 is a block diagram showing the internal construction of the user terminal used in one embodiment of the present invention.

FIG. 3 is a block diagram showing the internal construction of the user terminal 10 used in one embodiment of the present invention.

As shown in FIG. 3, the user terminal 10 used in the present invention includes a photographing unit 11, a decoder 13, a control unit 15, a user interface unit 17 and a transmitting/receiving unit 19. In FIG. 3, for convenience of description, components equal to those of a typical mobile terminal are omitted, but only components related to the present invention are depicted.

The photographing unit 11, which is a means for recognizing or photographing an image, functions to recognize (or photograph) the barcode 60, convert recognized (photographed) analog image data into digital image data, and transmit the digital image data to the decoder 13 in the present invention. The photographing unit 11 can be internally or externally provided in or on the user terminal 10. A scanner, a PC camera, a digital camera, a Web camera or the like can be used as the photographing unit 11.

The decoder 13 functions to analyze digital image data received from the photographing unit 11 and extract code information from the analyzed digital image data. The decoder 13 can be implemented with a one-dimensional or two-dimensional code recognizer depending on the type of the barcode 60. The code information extracted by the decoder 13 may be a preset code value. However, in other embodiments of the present invention, such as a third embodiment which will be described later, the user terminal 10 may not include the decoder 13. In this way, the user can be provided with the content providing service of the present invention using a conventional user terminal 10 equipped with a camera. In this case, the service provider server 130 should include a component for decoding.

The user interface unit 17 is a part to provide an interface between the user and the user terminal 10. In detail, the user interface unit 17 functions to provide a user interface so that the user can access the service provider server 130 to be provided with Internet content. Further, the user interface unit 17 functions to provide the user interface so that the user can access a corresponding Web server when Web page information is received from the service provider server 130. A Web browser is generally used as the user interface unit 17. Currently, a second-generation mobile communication terminal and a third-generation mobile communication terminal, such as a mobile terminal for International Mobile Telecommunications (IMT)-2000, have therein a wireless Web browser to support the downloading of multimedia data, such as moving images. Such a wireless Web browser generally supports a wireless Internet function using a Wireless Application Protocol (WAP), which is a protocol designed to simplify the amount of data to be processed so as to implement an Internet browser function in a mobile terminal having limitations in display and memory capacity.

The transmitting/receiving unit 19 functions to transmit the user content request message 90, including the code information 95 received from the decoder 13, to the service provider server 130. Further, the transmitting/receiving unit 19 transmits a barcode issue request message, including user contact information, to the service provider server 130 at a barcode issuing step.

The control unit 15, which is used to control the respective components, generates a photographing control signal and transmits the photographing control signal to the photographing unit 11 when a photographing button is pressed by the user, generates a decoding control signal, transmits the decoding control signal to the decoder 13, and transmits a transmission/reception control signal to the transmitting/receiving unit 19 so that the user content request message 90 is transmitted to the service provider server 130.

In FIG. 3, an example of the barcode 60 is depicted. The barcode 60 includes a one-dimensional barcode, and a PDF- 417 code, a QR code and a data matrix, which are two-dimensional barcodes, depending on the type of the barcode 60.

The barcode 60, which is widely used at the present time, is a one-dimensional barcode capable of representing only simple and limited information, such as alphabet letters and numeric characters. In contrast, the two-dimensional barcode is implemented in a plane form by arranging data horizontally and vertically, and is capable of representing even the Korean alphabet and image. In the present invention, the two-dimensional barcode is used to record a large amount of information in the present invention.

Figure 4:
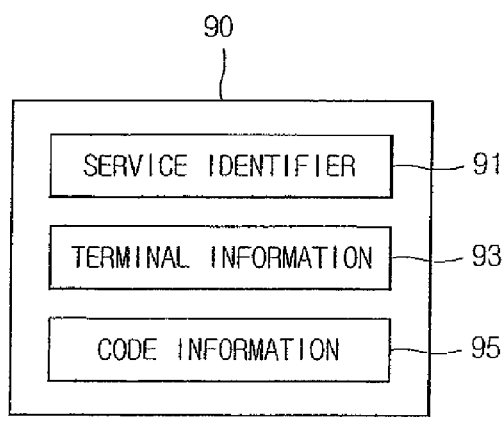
FIG. 4 is a view conceptually showing the data configuration of the user content request message.

FIG. 4 is a view conceptually showing the data configuration of the user content request message 90.

As shown in FIG. 4, in the user content request message 90, a service identifier 91, terminal information 93 and code information 95 are recorded.

The service identifier 91 is a part on which the type of a service the service provider server 130 should provide is to be recorded. The service provider server 130 can provide a plurality of services, which can utilize the barcode 60, for example, a content providing service, a taxi call service, an advertising service and a commodity purchase connecting service. For example, four bits are allocated to the service identifier 91, so that 0001, 0010, 0011 and 0100 can be used as identifiers to represent the taxi call service, the advertising service, the purchase connecting service, and the content providing service, respectively. In this case, the number of bits allocated to the service identifier 91 can be properly changed depending on the type of the service which the service provider server 130 provides, or if necessary.

The terminal information 93 is the phone number of the user terminal 10.

The code information 95 is generated by decoding the barcode 60 in the decoder 13 in the user terminal 10, and includes the information of a Web page having content related to the barcode. However, this data configuration is only an embodiment. In a first embodiment which will be described later (when the service provider server 130 personally provides content), code information is not necessary, and in a third embodiment (when the user terminal 10 is not provided with the decoder 13), a barcode image, not code information, may be included in the content request message 90.

Figure 5:
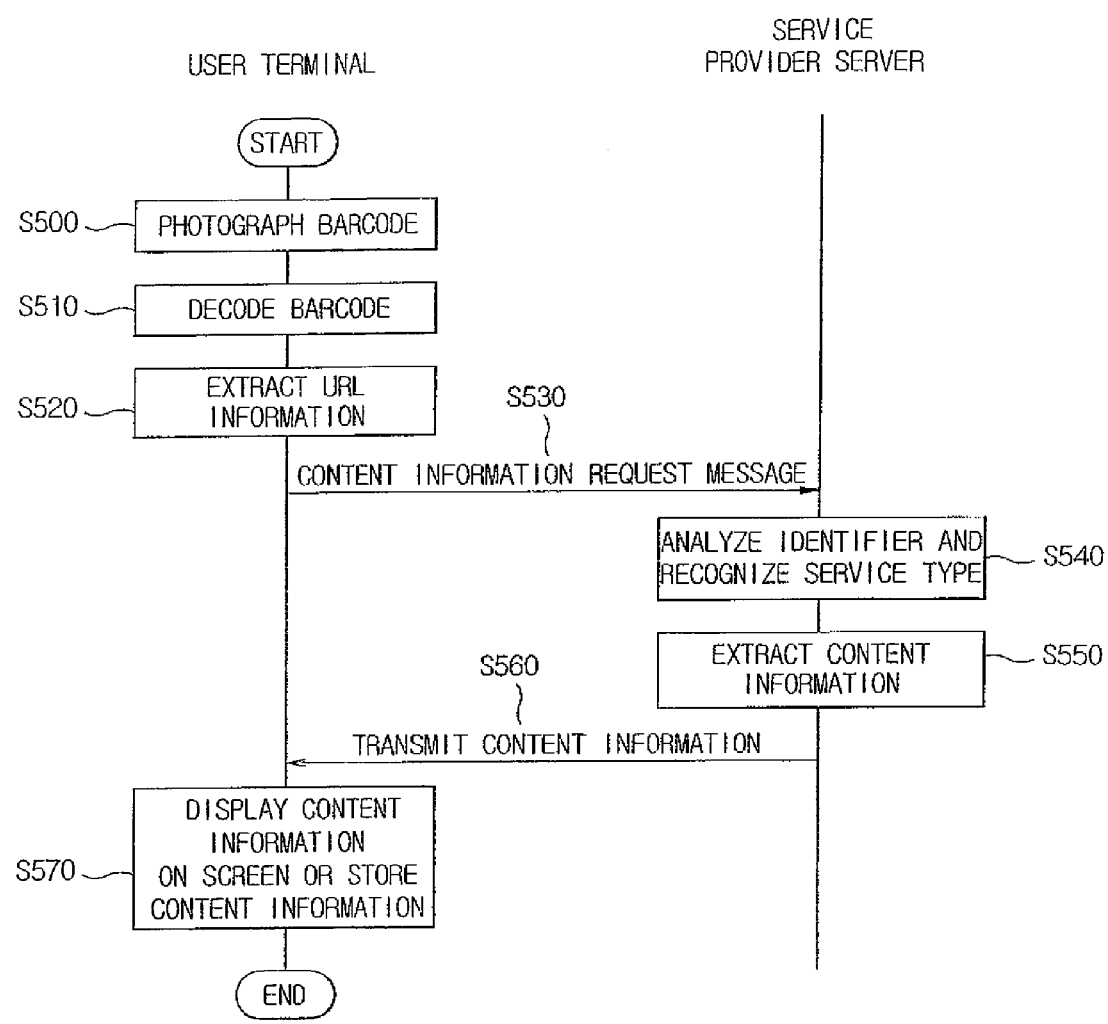
FIG. 5 is a flowchart of a content providing method using a barcode according to a first embodiment of the present invention.

FIG. 5 is a flowchart of a content providing method using a barcode according to a first embodiment of the present invention. The first embodiment shows a case where the user terminal 10 is provided with the decoder 13.

First, the user terminal 10 photographs a barcode 60 printed on a printed matter at step S500. For example, the user selects a barcode menu on the user terminal 10, presses a photographing button, and then photographs the barcode 60 printed on the printed matter using the photographing unit 11, such as a camera provided in the terminal.

The decoder 13 provided in the user terminal 10 decodes the photographed barcode 60 to extract the URL information of the service provider server 130 recorded on the barcode 60 at steps S510 and S520.

The user terminal 10 accesses the service provider server 130 using the extracted URL information, and transmits a content request message 90 to the service provider server 130 at step 530.

The service provider server 130 analyzes a service identifier 91 included in the received content request message at step S540. That is, the code distribution unit 132 in the service provider server 130 recognizes that a service type is a content providing service by analyzing the service identifier 91.

The control unit 134 extracts corresponding content on the basis of a content providing service recognition signal received from the code distribution unit 132 at step S550. In this case, the content may include any one of an image, a sound source, a moving image and text, or may be commodity information or commodity advertisement information, as will be described later.

If the service provider server 130 transmits the extracted content information to the user terminal 10 at step S560, the received content information is displayed on the screen of the user terminal 10 at step S570. In this case, the received content information may be stored depending on a user's selection. Further, if the content are sound sources or moving images, the sound sources are output through a sound output unit (not shown) of the user terminal 10.

Figure 6:
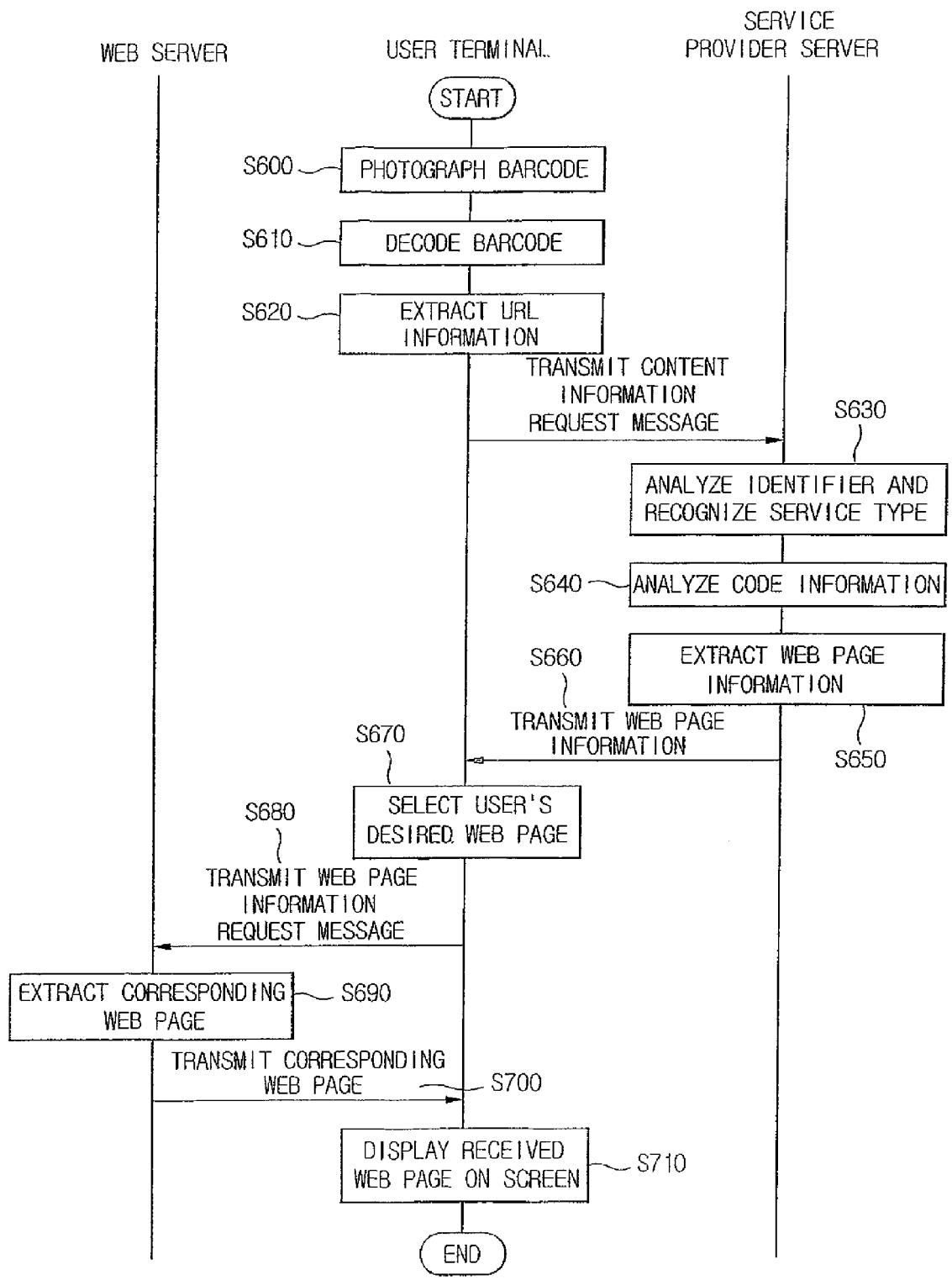
FIG. 6 is a flowchart of a content providing method using a barcode according to a second embodiment of the present invention.

FIG. 6 is a flowchart of a content providing method using a barcode according to a second embodiment of the present invention.

First, the user terminal 10 photographs a barcode 60 printed on a printed matter at step S600. For example, the user selects a barcode menu on the user terminal 10, presses a photographing button, and then photographs the barcode 60 printed on the printed matter using the photographing unit 11, such as a camera provided in the terminal.

The decoder 13 provided in the user terminal 10 decodes the photographed barcode image to extract code information 95 from the barcode image at step S610 and S620, and then transmits a content request message 90, including the code information 95, to the service provider server 130 at step S630.

The service provider server 130 analyzes a service identifier 91 included in the received content request message at step S640. That is, the code distribution unit 132 in the service provider server 130 analyzes the service identifier 91, recognizes that a service type is the content providing service, and transmits the code information 95 to the code information analyzing unit 135.

The code information 135 analyzes the received code information to extract Web page information at step S650. That is, the code information analyzing unit 135 extracts the Web page information corresponding to the received code information 95 from the code information database 140 with reference to the code information database 140. In this case, as will be described later, the Web page information may be the information of Web pages, such as an event entering site and a commodity information providing site.

If the service provider sever 130 transmits the extracted Web page information to the user terminal 10 at step S660, the user terminal 10 displays the received Web page information on the screen, and receives a Web page selection command from the user at step S670.

If the user terminal 10 transmits a Web page information request message to a Web server 150 corresponding to the received Web page selection command at step S680, the Web server 150 extracts a corresponding Web page and transmits the Web page to the user terminal 10 at steps S690 and S700.

Finally, the user terminal 10 displays the received Web page on the screen at step S710.

Figure 7:
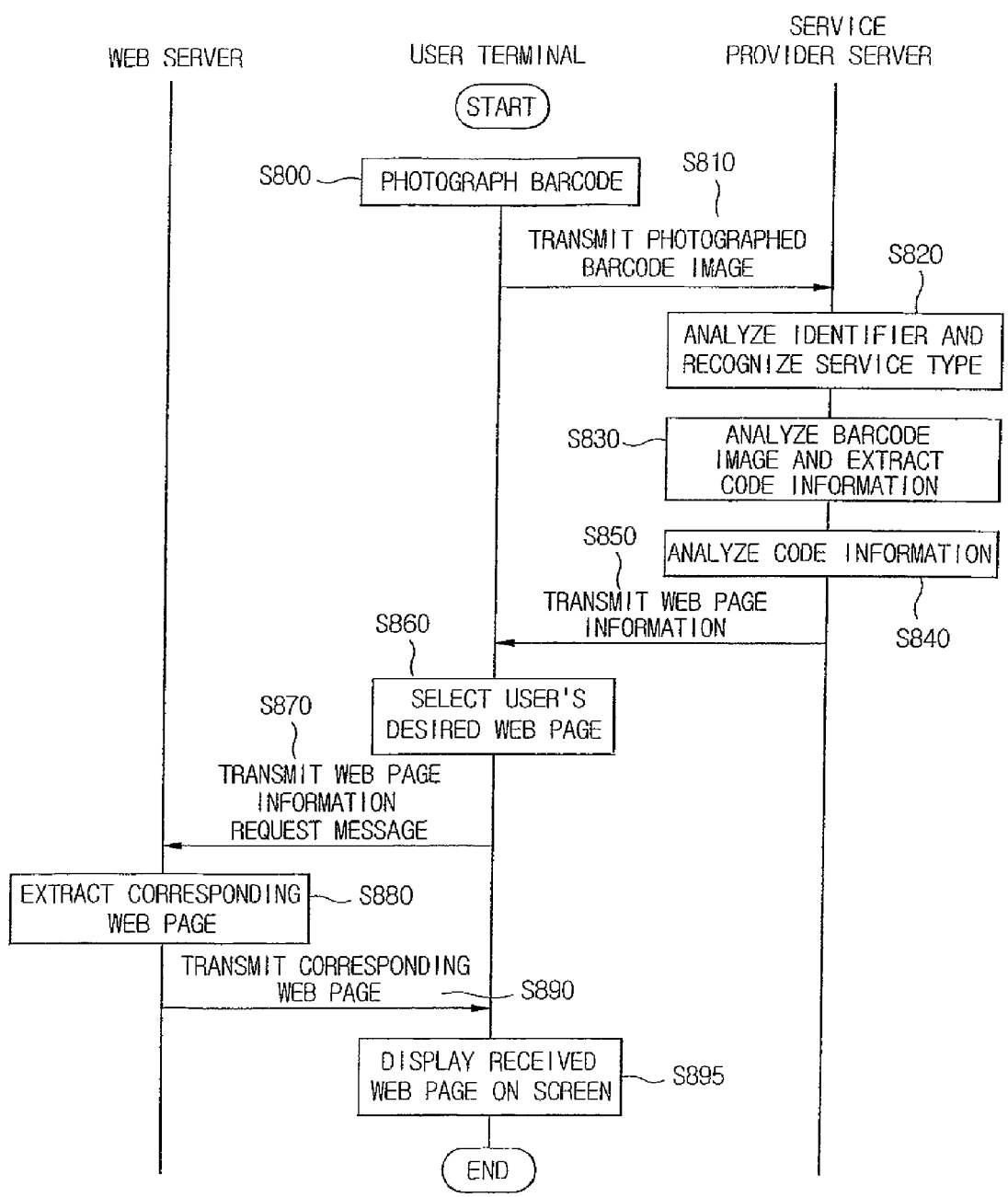
FIG. 7 is a flowchart of a content providing method using a barcode according to a third embodiment of the present invention.

FIG. 7 is a flowchart of a content providing method using a barcode according to a third embodiment of the present invention. The third embodiment shows a case where the user terminal 10 is not provided with the decoder 13.

First, the user terminal 10 photographs a barcode 60 printed on a printed matter at step S800. For example, the user selects a barcode menu on the user terminal 10, presses a photographing button, and then photographs the barcode 60 printed on the printed matter using the photographing unit 11, such as a camera provided in the terminal.

The user terminal 10 transmits a content request message 90 including the photographed barcode image to the service provider server 130 at step S810.

The service provider 130 analyzes a service identifier 90 included in the received content request message at step S820. That is, the code distribution unit 132 in the service provider server 130 analyzes the service identifier 91, recognizes that a service type is the content providing service, and transmits the received barcode image to the barcode image analyzing unit 133.

The barcode image analyzing unit 133 extracts code information corresponding to the barcode image, and transmits the code information to the code information analyzing unit 135 at step S830.

The code information analyzing unit 135 analyzes the received code information to extract Web page information at step S840. That is, the code information analyzing unit 135 extracts the Web page information corresponding to the received code information 95 from the code information database 140 with reference to the code information database 140. In this case, as will be described later, the Web page information may be the information of Web pages, such as an event entering site and a commodity information providing site.

If the service provider server 130 transmits the extracted Web page information to the user terminal 10 at step S850, the user terminal 10 displays the received Web page information on the screen, and receives a Web page selection command from the user at step S860.

If the user terminal 10 transmits a Web page information request message to a Web server 150 corresponding to the received Web page selection command at step S870, the Web server 150 extracts a corresponding Web page and transmits the Web page to the user terminal 10 at steps S880 and S890.

Finally, the user terminal 10 displays the received Web page on the screen at step S895.

Hereinafter, for ease of understanding of the present invention, respective embodiments are described using detailed examples.

First Example

News-Related Information Provision

For example, it is assumed that a user desires to view the trailer of a specific movie while reading news related to the specific movie in a newspaper or a magazine. If the user applies the photographing unit 11 of the user terminal 10 to the barcode 60 printed on a portion of the movie news and then selects a barcode reading menu, the user terminal 10 accesses the Web site of the service provider server 130 recorded on the barcode 60. If the Web site extracts moving image data for the trailer of a corresponding movie and transmits the moving image data to the user terminal 10, the user can view the trailer of the movie through the user terminal 10.

Alternatively, the service provider 130 can search for Web pages corresponding to Web sites that provide moving images for the trailer of the movie, and provide the information of the Web pages to the user terminal 10, and the user can access the received Web page and view the trailer of the movie.

Second Example

Commodity Purchase Site Access

For example, it is assumed that a user desires to purchase a corresponding commodity while reading a commodity advertisement inserted in a newspaper or a magazine. If the user applies the photographing unit 11 of the user terminal 10 to the barcode 60 printed on a portion of the commodity advertisement and then selects a barcode reading menu, the user terminal 10 accesses the Web site of the service provider server 130 recorded on the barcode. If the Web site extracts the commodity information or purchase information of the corresponding commodity and transmits the extracted information to the user terminal 10, the user can confirm the information through the user terminal 10 and then determine whether to purchase the commodity.

Alternatively, the service provider server 130 can search for Web pages corresponding to Web sites that provide the commodity information or purchase information of the commodity, and provide the searched information to the user terminal 10, and the user can access the received Web page and then purchase the commodity.

Third Example

Event Entering Site Access

For example, it is assumed that a user desires to enter an event while reading an event entering advertisement inserted in a newspaper or a magazine. If the user applies the photographing unit 11 of the user terminal 10 to a barcode 60 printed on a portion of the event entering advertisement and then selects a barcode reading menu, the user terminal 10 accesses the Web site of the service provider server 130 recorded on the barcode. If the Web site extracts corresponding event entering information and transmits the event entering information to the user terminal 10, the user can confirm the information through the user terminal 10 and then enter the event.

Figure 8:
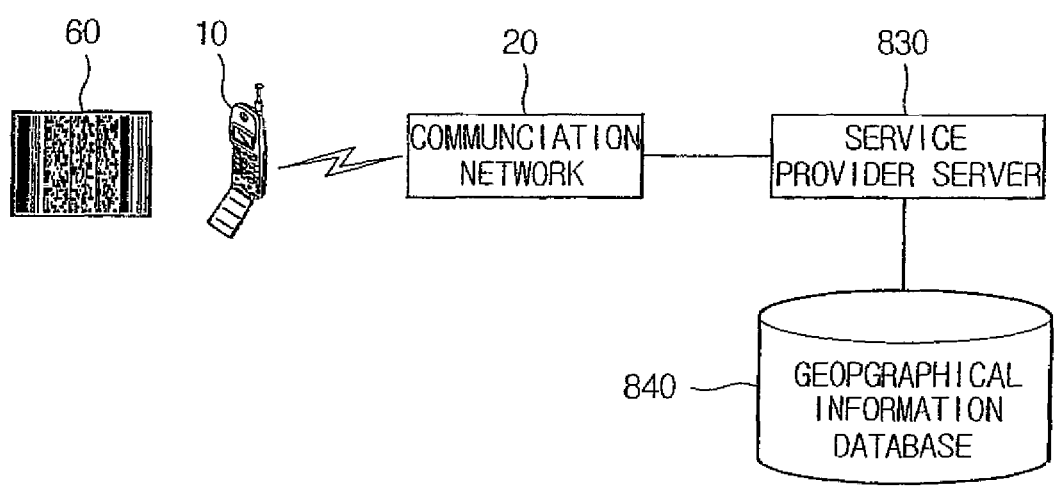
FIG. 8 is a view showing the construction of a geographical information providing system using a code pattern according to one embodiment of the present invention.

FIG. 8 is a view showing the construction of a geographical information providing system using a code pattern according to the present invention.

As shown in FIG. 8, the geographical information providing system using a code pattern according to the present invention comprises a user terminal 10 and a service provider server 830.

The user terminal 10, which is a mobile communication terminal connected to the service provider server 830 through a communication network 20 including a wireless communication network and a wired communication network, transmits and receives information to and from the service provider 830 through the communication network 20. A wireless communication terminal, such as a mobile phone, PCS and PDA, can be used as the user terminal 10. The terminal 10 used in the present invention has a function of reading and decoding the barcode 60. The user terminal 10 reads the barcode 60 printed on a tourist guidebook, a regional guideboard, etc., extracts the detailed URL information of a Web page recorded on the barcode 60, accesses the service provider server 830 corresponding to the URL information, and requests geographical information, such as sightseeing information or regional information, from the service provider server 830. The detailed construction of the user terminal 10 will be described later with reference to FIG. 10. Further, a PC or notebook computer, as well as a mobile terminal, can be used as the user terminal 10.

The service provider server 830 is a computer provided in a service provider that provides the geographical information providing service using a code pattern of the present invention, and functions to receive a geographical information request message (1000 of FIG. 10) from the user terminal 10 through the communication network 20, extract the content of a Web page including the geographical information, and transmit the extracted Web page information to the user terminal 10. In this case, the service provider server 830 may be the computer of a service provider independent of a communication service provider (not shown) that provides the communication network 20, or the computer of a communication service provider if the communication service provider personally provides the service using the communication network 20 and the computer thereof.

Figure 9:
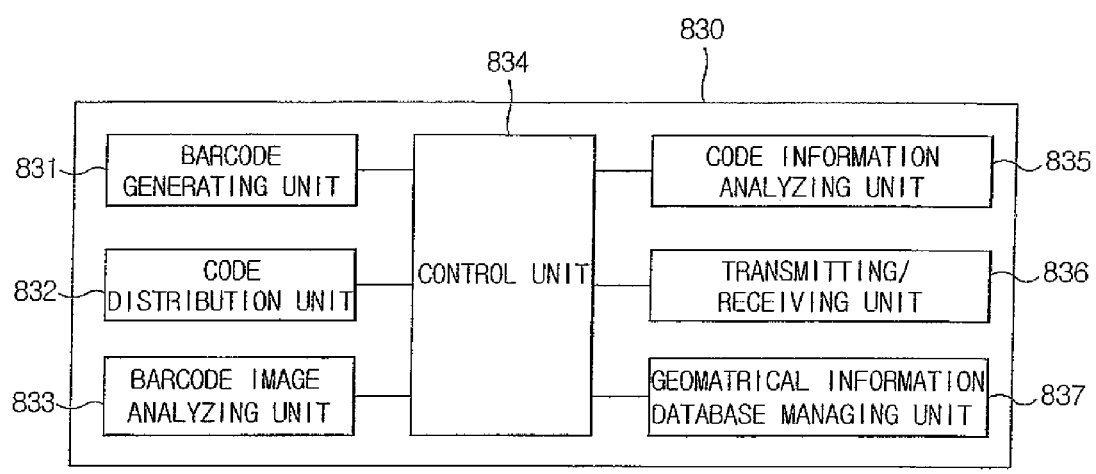
FIG. 9 is a block diagram showing the internal construction of the service provider server of FIG. 8.

FIG. 9 is a block diagram showing the internal construction of the service provider server 830 of FIG. 8. As shown in FIG. 9, the service provider server 830 includes a barcode generating unit 831, a code distribution unit 832, a barcode image analyzing unit 833, a code information analyzing unit 835, a transmitting/receiving unit 836, a geographical information database managing unit 837, and a control unit 834. In order to describe the respective components of the service provider server 830 of FIG. 9, FIGS. 3, 8 and 10 are referred to together with FIG. 9.

The barcode generating unit 831 is adapted to generate a barcode 60 corresponding to the address information of a Web page that provides geographical information. The barcode generating unit 831 codes the address information of a Web page that provides specific regional information in a preset format to generate code information, and then generates a barcode image 1005 corresponding to the code information. In this case, the Web page address information denotes the detailed URL information of the Web page, and the URL may be a numeric URL. That is, the barcode generating unit 831 converts the detailed URL information of the Web page into binary codes to generate a two-dimensional barcode image 1005.

The code distribution unit 832, which is adapted to analyze a service identifier 1001 included in a specific regional information request message 1000 received from the user terminal 10 and then classify service types, analyzes the service identifier 1001, recognizes that a service type is a geographical information providing service, and transmits the barcode image 1005 to the barcode image analyzing unit 833 if the barcode image 1005 is included in the specific regional information request message received from the user terminal 10.

The barcode image analyzing unit 833 is adapted to receive the barcode image 1005 photographed by the photographing unit 11, extract code information from the barcode image 1005 and transmit the code information to the code information analyzing unit 835, in a case where a decoder 13 for decoding the barcode 60 is not provided in the user terminal 10.

The code information analyzing unit 835 functions to analyze the code information received from the barcode image analyzing unit 833 and extract detailed URL, which is Web page address information, from the analyzed code information. The code information analyzing unit 835 extracts the URL information of the Web page corresponding to the code information with reference to a geographical information database 840 storing therein the information of detailed URL that provides specific regional information corresponding to the received code information.

The transmitting/receiving unit 836 functions to transmit and receive data related to the geographical information providing service to and from the user terminal 10. That is, the transmitting/receiving unit 836 receives the specific regional information request message from the user terminal 10, and transmits Web page content including the extracted specific regional information to the user terminal 10.

The geographical information database managing unit 837 functions to manage the geographical information database 840 that stores therein Web page address information corresponding to code information.

The control unit 834 is adapted to control the respective components, and functions to generate a barcode generation control signal required to generate a barcode related to specific regional information, transmits the barcode generation control signal to the barcode generating unit 831, generates a control signal required to extract Web page content corresponding to the received specific regional information request message 1000, and transmits the control signal to the code information analyzing unit 835. Further, the control unit 834 generates a barcode image analysis control signal and transmits the barcode image analysis control signal to the barcode image analyzing unit 833 when the barcode image 1005 is transmitted from the user terminal 10.

In this embodiment, the barcode image analyzing unit 833 and the code information analyzing unit 835 are separately constructed. However, it is properly possible to integrate these functions and allow the barcode image analyzing unit 833 to have a function of analyzing code information.

Figure 10:
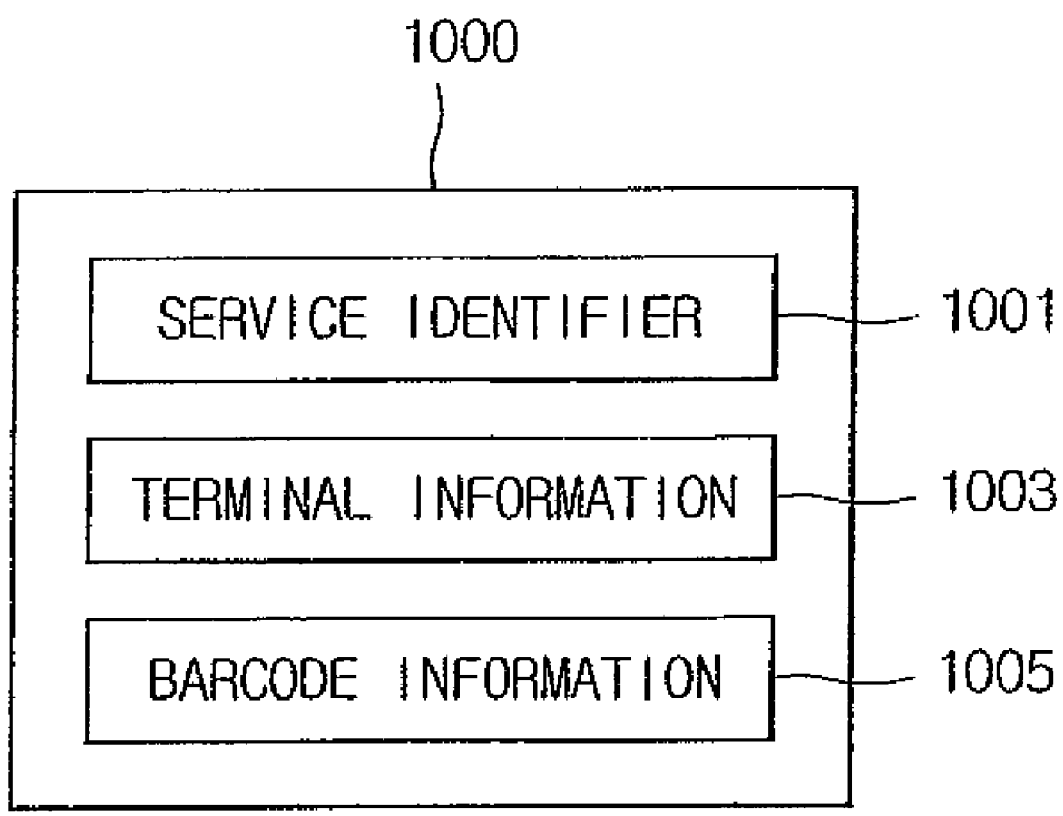
FIG. 10 is a view conceptually showing the data configuration of the specific regional information request message.

FIG. 10 is a view conceptually showing the data configuration of the specific regional information request message 1000.

As shown in FIG. 10, in the specific regional information request message 1000, a service identifier 1001, terminal information 1003 and code information 1005 are recorded.

The service identifier 1001 is a part on which the type of a service the service provider server 830 should provide is to be recorded. The service provider server 830 can provide a plurality of services, which can utilize the barcode 60, for example, a user contact information providing service, a taxi call service, an advertising service, a commodity information providing service, a geographical information providing service, a tax payment service, etc. For example, four bits are allocated to the service identifier 1001, so that 0001, 0010, 0011, 0100, 0101 and 0110 can be used as identifiers to represent the taxi call service, the advertising service, the commodity information providing service, the user contact information providing service, the geographical information providing service, and the tax payment service, respectively. Therefore, in this embodiment, the service identifier 1001 would be 0101. In this case, the number of bits allocated to the service identifier 1001 can be properly changed depending on the type of the service which the service provider server 830 provides, or if necessary.

The terminal information 1003 is the phone number of the user terminal 10.

The barcode image 1005 is formed by photographing the barcode 60 through the photographing unit 11 and converting the photographed barcode into digital image data. As described above, the barcode image 1005 is required when the user terminal 10 is not provided with the decoder 13, while it is not required when the user terminal is provided with the decoder 13.

Figure 11:
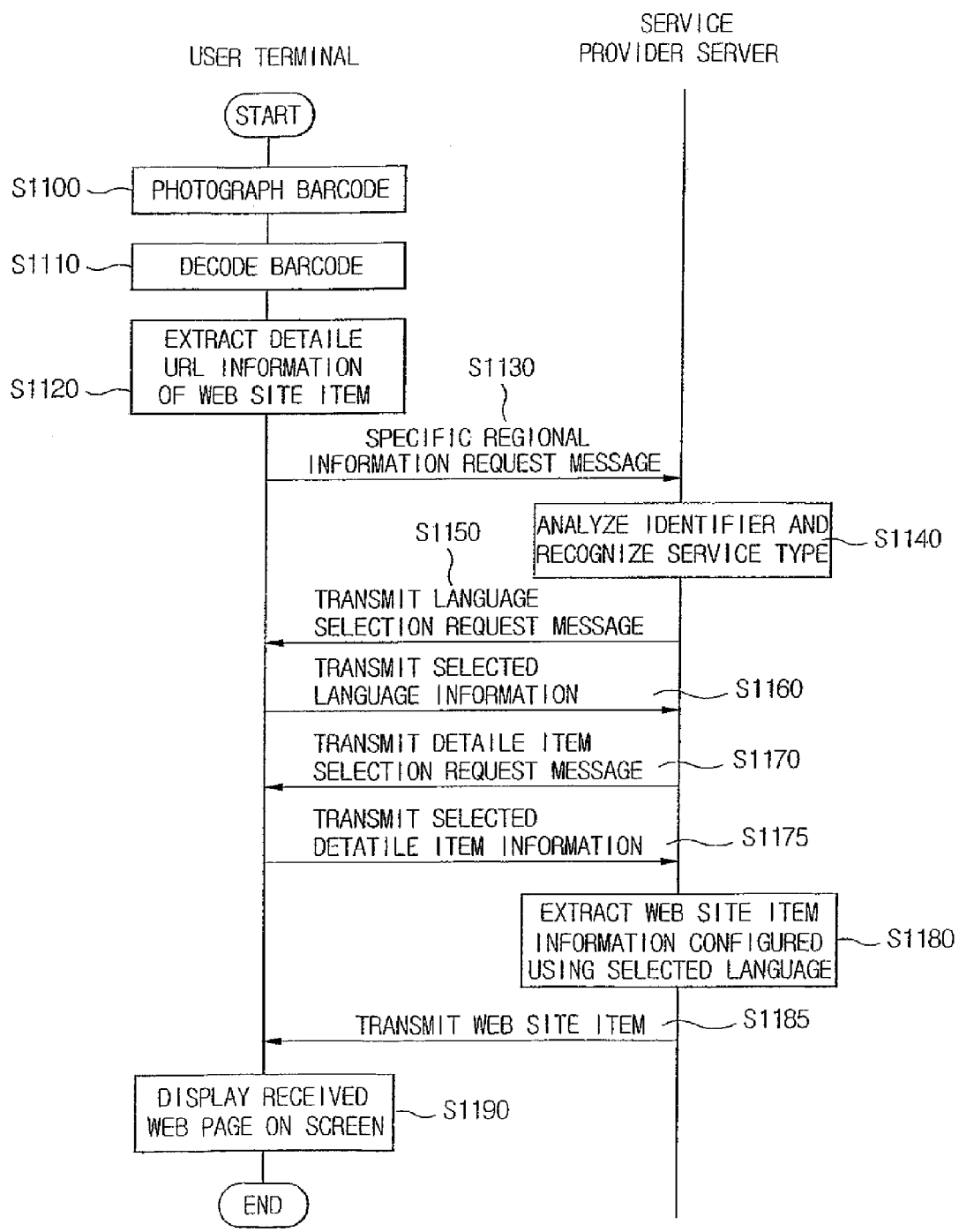
FIG. 11 is a flowchart of a geographical information providing method using a code pattern according to a fourth embodiment of the present invention.

FIG. 11 is a flowchart of a geographical information providing method using a code pattern according to a fourth embodiment of the present invention. The fourth embodiment shows a case where the user terminal 10 is provided with the decoder 13.

First, the user terminal 10 photographs a barcode 60 printed on a portion of a tourist guidebook or a regional guideboard at step S1100. For example, the user selects a barcode menu on the user terminal 10, presses a photographing button, and then photographs the barcode 60 printed on the guidebook or the guideboard using the photographing unit 11, such as a camera provided in the terminal.

The decoder 13, provided in the user terminal 10, decodes a photographed barcode image to extract detailed URL information of a Web page that provides specific regional information at steps S1110 and 1120.

The user terminal 10 accesses the Web page using the extracted detailed URL, and transmits a specific regional information request message 1000 to the service provider server 830 at step S1130.

The service provider server 830 analyzes a service identifier 1001, included in the received specific regional information request message 1000, and then recognizes a service type at step S1140. That is, the code distribution unit 832 in the service provider server 830 analyzes the service identifier 1001, recognizes that a service type is the geographical information providing service, and notifies the control unit 834 that the service type is the geographical information providing service.

If the service provider server 830 transmits a language selection request message to the user terminal 10 at step S1150, the user terminal 10 receives language selection information from the user and transmits the selected language information to the service provider server 830 at step S1160. For example, if a foreigner lends and uses a roaming phone for domestic communication during domestic travel, the foreigner selects his or her language on a menu displayed on the screen of the terminal, thus viewing specific regional information configured using his or her language.

If a language is selected, the service provider server 830 transmits a detailed item selection request message, including a detailed item list required to select the detailed items of the specific regional information, to the user terminal 10 at step S1170. In this case, the detailed items may include characters, moving images, or guide messages related to relics, in the case of the tourist guidebook, or may include the information of sightseeing places, shopping centers, population, surrounding rough maps, public offices or traffic around a specific region in the case of the regional guideboard.

The user terminal 10 displays the detailed item list on the screen, receives a selection command for any one of displayed detailed items from the user, and transmits the selected detailed item information to the service provider server 830 at step S1175. For example, if the user desires to know the information of a bus toward a city hall, the user can select a traffic information item on the menu displayed on the screen.

The control unit 834 of the service provider server 830 extracts a Web page corresponding to the detailed item configured using the selected language, on the basis of the notification signal received from the code distribution unit 832 and the selected language information and detailed item information received from the user terminal 10 at step S1180.

The service provider server 830 transmits the extracted Web page content to the user terminal 10 at step S1185. The transmitted Web page content are displayed on the screen of the user terminal 10 at step S1190. According to the above example, the information of a bus, a subway, etc. around the specific region is displayed on the screen of the user terminal 10.

Figure 12:
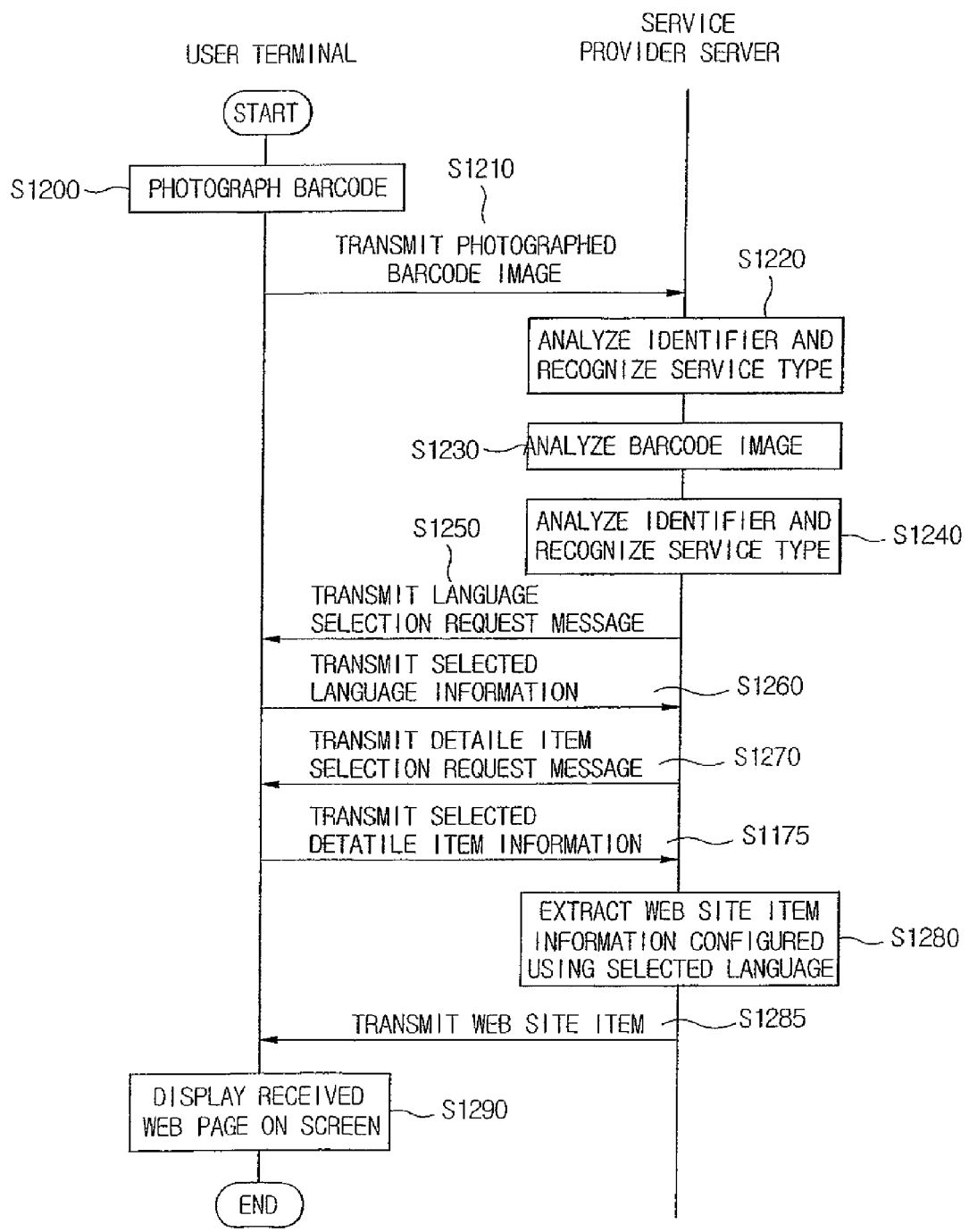
FIG. 12 is a flowchart of a geographical information providing method using a code pattern according to a fifth embodiment of the present invention.

FIG. 12 is a flowchart of a geographical information providing method using a code pattern according to a fifth embodiment of the present invention. The fifth embodiment shows a case where the user terminal 10 is not provided with the decoder 13.

First, the user terminal 10 photographs a barcode 60 printed on a portion of a tourist guidebook or a regional guideboard at step S1200. For example, the user selects a barcode menu on the user terminal 10, presses a photographing button, and then photographs the barcode 60 printed on the guidebook or the guideboard using the photographing unit 11, such as a camera provided in the terminal.

The user terminal 10 transmits a photographed barcode image 95 to the service provider server 830 at step S1210.

The service provider server 830 analyzes a service identifier 1001, included in a received specific regional information request message, and then recognizes a service type at step S1220. That is, the code distribution unit 832 in the service provider server 830 analyzes the service identifier 1001 and then recognizes that a service type is the geographical information providing service.

The barcode image analyzing unit 833 in the service provider server 830 analyzes the received barcode image to extract code information from the barcode image, and then transmits the extracted code information to the code information analyzing unit 835 at step S1230.

If the service provider server 830 transmits a language selection request message to the user terminal 10 at step S1240, the user terminal 10 receives language selection information from the user and transmits the selected language information to the service provider server 830 at step S1250. For example, if a foreigner lends and uses a roaming phone for domestic communication during domestic travel, the foreigner selects his or her language on a menu displayed on the screen of the terminal, thus viewing specific regional information configured using his or her language.

If a language is selected, the service provider server 830 transmits a detailed item selection request message, including a detailed item list required to select the detailed items of the specific regional information, to the user terminal 10 at step S1260. In this case, the detailed items may include characters, moving images, or guide messages related to relics, in the case of the tourist guidebook, or may include the information of sightseeing places, shopping centers, population, surrounding rough maps, public offices or traffic around a specific region in the case of the regional guideboard.

The user terminal 10 displays the detailed item list on the screen, receives a selection command for any one of displayed detailed items from the user, and transmits the selected detailed item information to the service provider server 830 at step S1270. For example, if the user desires to know the information of a bus toward a city hall, the user can select a traffic information item on the menu displayed on the screen.

The code information analyzing unit 835 analyzes received code information, and then extracts a Web page corresponding to the detailed item configured using the selected language, on the basis of the selected language information and detailed item information received from the user terminal 10 at step S1280. That is, the code information analyzing unit 835 extracts Web page content corresponding to the selected language, detailed item and code information 1005 from the geographical information database 840 with reference to the geographical information database 840.

The service provider server 830 transmits the extracted Web page content to the user terminal 10 at step S1285. The transmitted Web page content are displayed on the screen of the user terminal 10 at step S1290. According to the above example, the information of a bus, a subway, etc. around the specific region is displayed on the screen of the user terminal 10.

Hereinafter, detailed examples to which the above embodiments are to be applied are described. The above embodiments will be more clearly understood by the following examples.

Fourth Example

Sightseeing Information Service

For example, it is assumed that a foreigner from France comes to this country for domestic travel and lends a roaming phone for domestic communication and a tourist guidebook, in which the barcode 60 of the present invention is printed with respect to each sightseeing place, at an airport or other places.

When finding out a desired sightseeing place while reading the tourist guidebook, the foreigner photographs the barcode 60 printed in relation to the corresponding sightseeing place using the lent roaming phone. Then, the roaming phone accesses a Web site providing sightseeing place guide information, and displays a language selection menu on the screen of the roaming phone. The foreigner selects French, which is the language of his or her own country, on the language selection menu. Then, on the screen of the roaming phone, detailed menu items, such as picture view, moving image view, guide message listen, traffic guide and related information, are displayed. If the foreigner selects the moving image view item, the Web site transmits the moving image data related to the corresponding sightseeing place to the roaming phone, and the moving image is played through the roaming phone.

Fifth Example

Geographical Information Service

For example, it is assumed that Mr. K is located now in Seoul station and should go to Seoul city hall on business.

Mr. K photographs a barcode 60 printed on a portion of a guideboard installed in front of the Seoul station using his terminal. Then, the terminal accesses a Web site providing geographical information and displays a language selection menu on the screen of the terminal. Mr. K selects Korean on the language selection menu. Then, detailed menu items, such as rough map view, surrounding sightseeing place information, surrounding public office information, and call connection, are displayed on the screen of the terminal. If Mr. K selects the surrounding public office information item, the Web site transmits the information of public offices placed around the Seoul station to the terminal, and the public office information is displayed on the terminal. If K selects a city hall among the public offices displayed on the screen of the terminal, information, rough map and the like related to the city hall are displayed on the screen, so that Mr. K can easily find out the city hall by viewing the above information.

Figure 13:
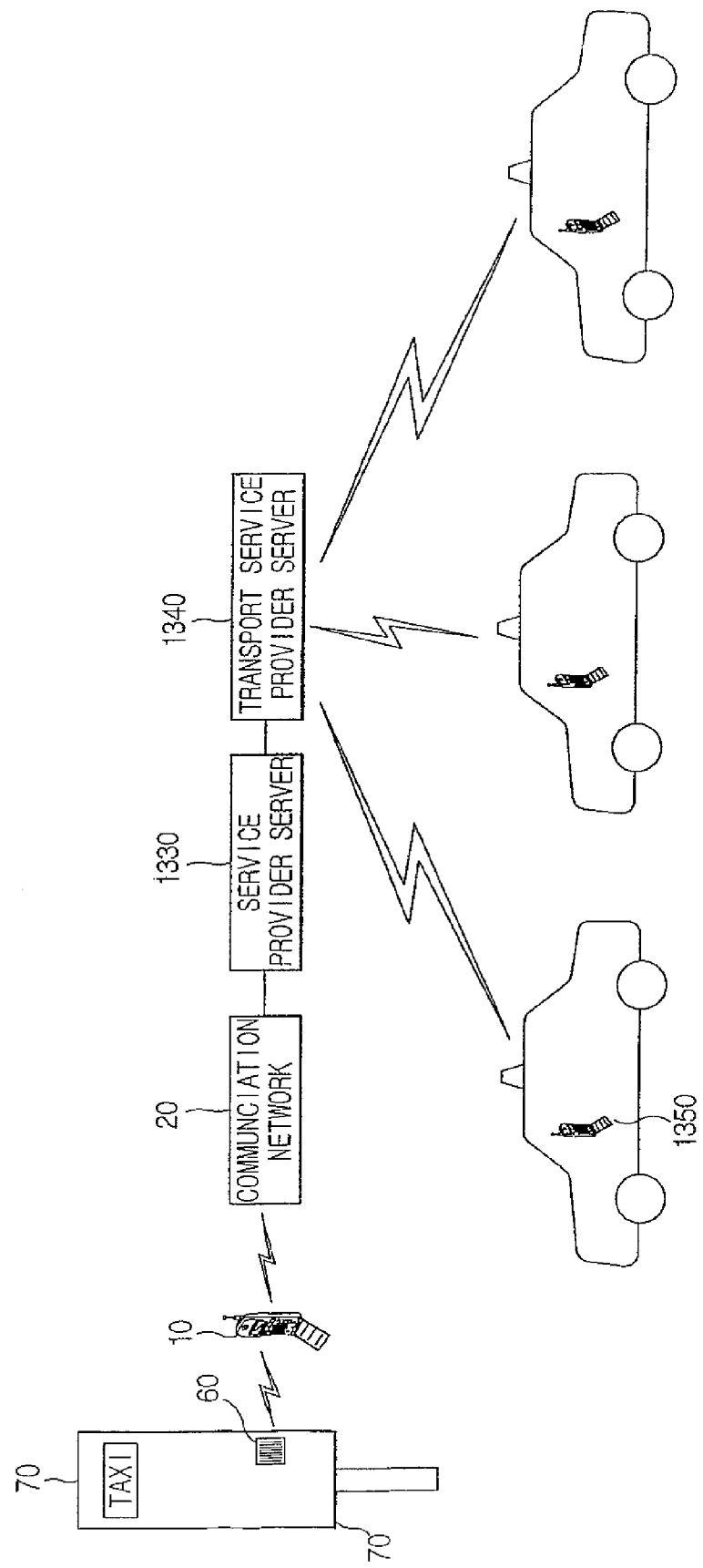
FIG. 13 is a first configuration view showing a system for providing a taxi call service using a code pattern according to one embodiment of the present invention.

FIG. 13 is a first configuration view showing a system for providing a taxi call service using a code pattern according to one embodiment of the present invention.

As shown in FIG. 13, the taxi call service providing system using a code pattern of the present invention comprises a user terminal 10, a service provider server 1330, a transport service provider server 1340, and a taxi terminal 1350.

The user terminal 10, which is a mobile communication terminal connected to the service provider server 1330 through a communication network 20 including a wireless communication network and a wired communication network, transmits and receives information to and from the service provider 1330 through the communication network 20. A wireless communication terminal, such as a mobile phone, PCS and PDA, can be used as the user terminal 10. The terminal 10 used in the present invention has a function of reading and decoding the barcode 60, so that the terminal 10 reads the barcode 60 printed on a portion of a station, extracts code information recorded on the barcode 60, and then transmits the code information to the service provider server 1330 through the communication network 20.

The detailed construction of the user terminal 10 is identical with that of FIG. 3. However, the code information extracted by a decoder 13 may be a preset code value or URL information of the transport service provider server 1340. A transmitting/receiving unit 19 functions to transmit a taxi call message, including the code information received from the decoder 13, to the service provider server. However, if the code information analyzed by the decoder 13 is URL of the transport service provider server 1340, the transmitting/receiving unit 19 may directly transmit the taxi call message to the transport service provider server 1340 without passing through the service provider server 1330.

The service provider server 1330 is a computer provided in a service provider that provides the taxi call service of the present invention, and functions to receive the taxi call message, including the code information obtained by decoding the barcode 60, from the user terminal 10 through the communication network 20, and then transmit the taxi call message to the transport service provider server 1340. In this case, the service provider server 1330 may be the computer of a service provider independent of a communication service provider (not shown) that provides the communication network 20, or the computer of a communication service provider, such as KTF corporation of Korea, if the communication service provider personally provides the service using the communication network 20 and the computer thereof. The service provider server 1330 may include an index database (not shown) for storing therein a barcode mapping table so as to extract transport service provider information and station location information based on the code information received from the user terminal 10 in a seventh embodiment, which will be described later.

The transport service provider server 1340 is connected to the service provider server 1330 through a network in a Transmission Control Protocol/Internet Protocol (TCP/IP) or Point-to-Point Protocol (PPP) manner. For such a network, there are the Internet, Local Area Network (LAN), Metropolitan Area Network (MAN), etc., however, the Internet is most generally used. The transport service provider server 1340 detects the nearest taxi from a station where the user is currently located on the basis of the taxi call message received from the service provider server, and transmits a taxi call message, including the station location information, to the taxi terminal 1350 provided in the taxi.

In this case, for a method of detecting the location of the taxi, there can be used a method using cell ID which allows the user terminal 10 to inform a base station (not shown) of the current location of the user terminal 10 in advance and then enables a switching center (not shown) to detect the location of the mobile terminal, a method using a Global Positioning System (GPS) which tracks the location of the user terminal 10 using a GPS satellite, and a method using Advanced Global Positioning System (AGPS) which tracks the location of the mobile terminal in combination with the positioning information obtained by the base station through the combination of the cell ID method with the GPS technology when the mobile terminal enters the central area of a town having a difficulty in measuring through a satellite.

The taxi terminal 1350, which is a mobile terminal provided in a taxi, can employ a mobile phone, PCS, PDA or the like, similar to the mobile terminal 10. If the taxi terminal 1350 receives the taxi call message from the transport service provider server 1340, the taxi terminal 1350 transmits a taxi call approval message, including expected arrival time information, to the user terminal 10.

Figure 14:
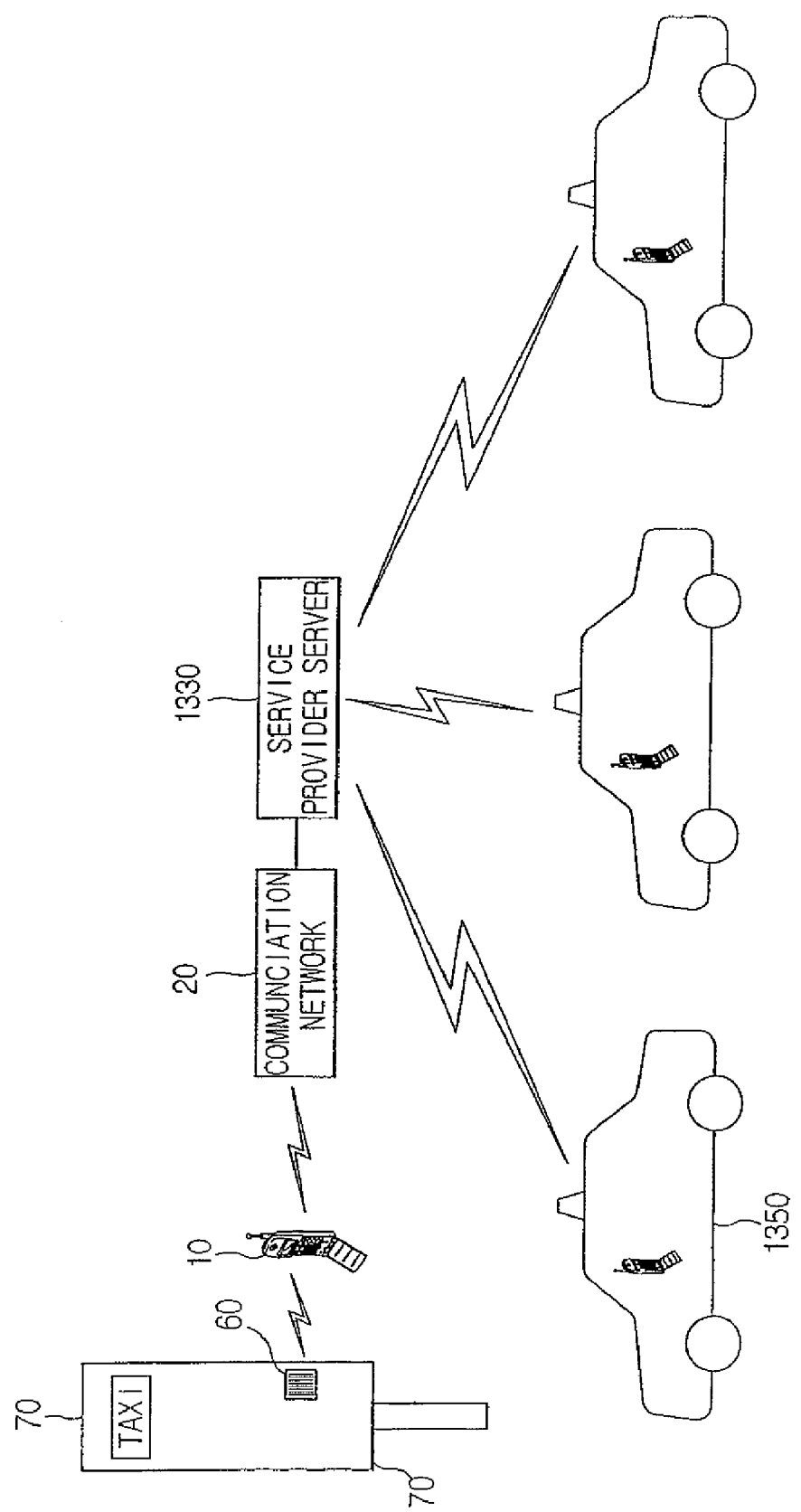
FIG. 14 is a second configuration view of a system for providing a taxi call service using a barcode according to one embodiment of the present invention.

FIG. 14 is a second configuration view of a system for providing a taxi call service using a barcode 60 according to one embodiment of the present invention.

The second configuration of the system of the present invention is different from the first configuration of FIG. 13 in that the second configuration does not include the transport service provider server 1340.

In the second configuration of the system, because the functions of the user terminal 10 and the taxi terminal 1350 are equal to those of the first configuration of the system, detailed descriptions thereof are omitted.

The service provide sever 1330 tracks the location of the taxi terminal 1350, detects a nearest taxi from a station where the user terminal 10 is located, and transmits a taxi call message to the taxi terminal 1350, besides the above-described functions. In this case, the service provider server should have a location tracking device, or be provided with the location information of the taxi terminal 1350 from an external location tracking device. That is, the service provider server 1330 should be provided with the location information of the taxi terminal 1350 based on the cell ID method from a communication service provider, or provided with the location information of the taxi terminal 1350 from a GPS satellite. If the Web server operated by the communication service provider is a service provider server that provides the taxi call service of the present invention, it is possible that the communication service provider tracks the current location of the taxi terminal 1350 depending on the cell ID method through the use of the communication network 20 of the communication service provider.

Figure 15:
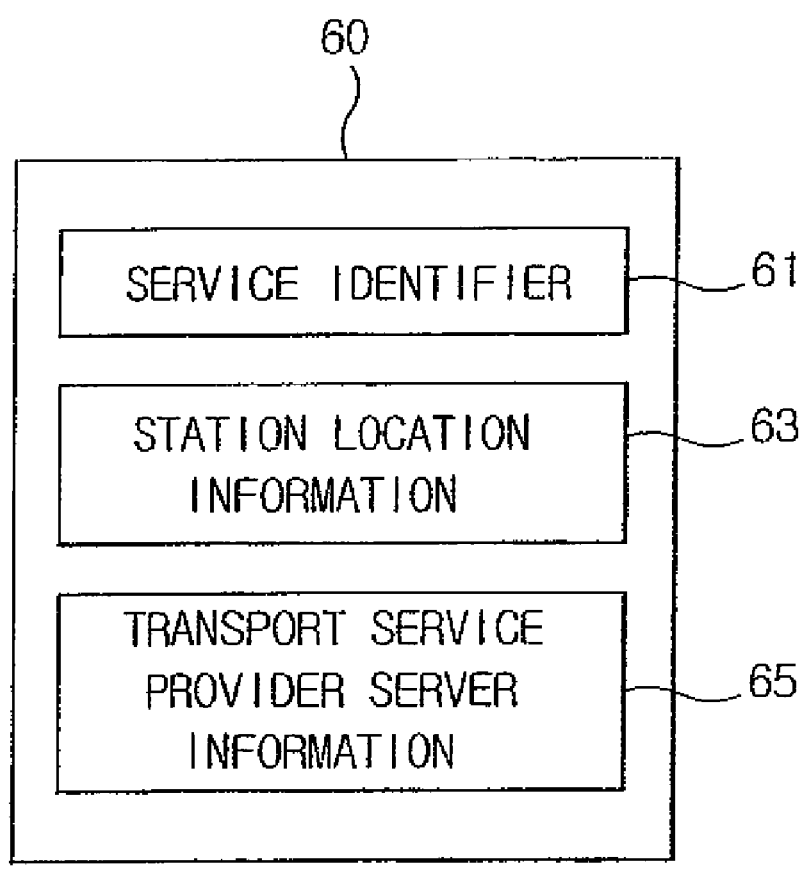
FIG. 15 is a view conceptually showing the information which is stored in the barcode used in one embodiment of the present invention.

FIG. 15 is a view conceptually showing the information which is stored in the barcode 60 used in one embodiment of the present invention.

The barcode 60 includes a one-dimensional code and a PDF-417 code, a QR code and a data matrix, which are two-dimensional barcodes, depending on the types of the barcode 60.

The barcode 60, which is generally and recently used, is a one-dimensional barcode and is capable of representing only simple and limited information, such as alphabet characters, numerals. In contrast the two dimensional barcode is formed to be expanded by arranging data horizontally and vertically, and is capable of presenting even Korean alphabet and image. In the present invention, a two-dimensional barcode is used to record a large amount of information in the present invention.

As shown in FIG. 15, in the barcode 60 used in the present invention, a service identifier 61, station location information 63 and information 65 about transportation service provider server are recorded.

The service identifier 61 is a part in which a service type the service provider server 1330 should provide is recorded. The service provider server 1330 can provide a plurality of services, which can be provided using the barcode 60, such as a taxi call service, an advertising service, a commodity purchase connecting service and telephone connecting service. So, for example, four bits are allocated to the service identifier 61, so that 0001, 0010, 0011 and 0100 can be used as identifiers to represent the taxi call service, the advertising service, the purchase connection service, and the telephone connecting service, respectively. In this case, the number of bits allocated to the service identifier 61 can be properly changed depending on the types of services which the service provider server 1330 provides or if necessary.

The station location information 63 is part which indicates the present location of the user terminal 10. Barcode maker records the number which is allocated to the station, in which the user terminal 10 is currently located, into the barcode 60.

The information 65 about transportation service provider server is a part which indicates the information about web server which the company, which runs taxi service, operates. As described above, the information 65 about transportation service provider server may be a numeric URL, text URL or IP address of the transportation service provider server.

In this case, the user terminal 10 can access the transportation service provider serve 1340 using the URL or IP address. Furthermore, in case that the service provider server provides taxi call service to a plurality of transportation service providers, the service provider server includes transportation service provider database in which the information 65 about transportation service providers is recorded. In that case, the barcode does not the information 65 about transportation service providers.

In reference with FIGS. 16-19, process of each method of providing taxi call service according to respective embodiment of the present invention is illustrated below.

Figure 16:
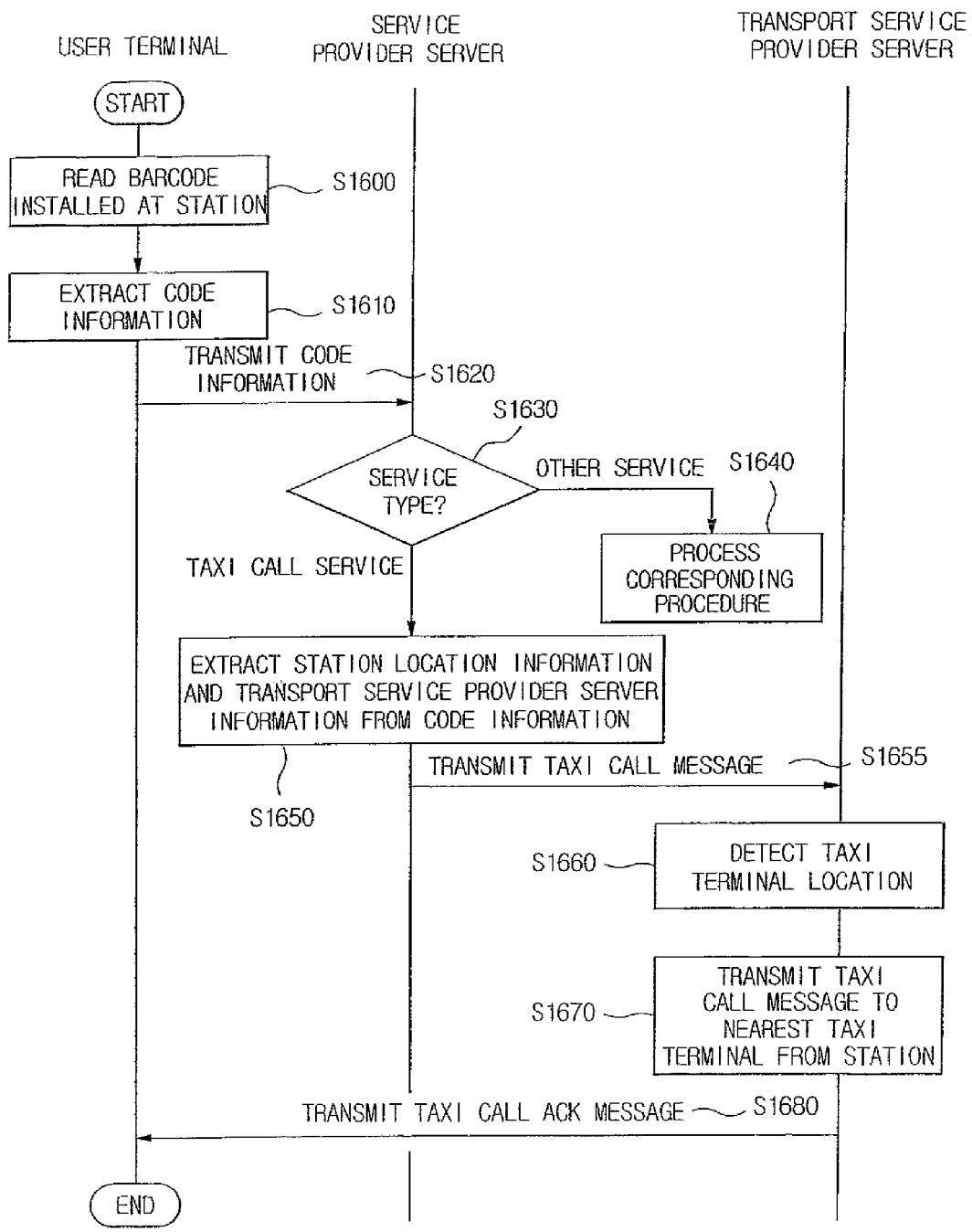
FIG. 16 is a flowchart of a method of providing taxi call service using a barcode according to a sixth embodiment of the present invention.

FIG. 16 is a flowchart of a method of providing taxi call service using a barcode according to a sixth embodiment of the present invention.

First, the terminal 10 reads the barcode 60 installed at station at step S1600. That is, a user goes to the station to catch a taxi and set the terminal 10 in barcode recognizing mode and then moves the photographing unit 11 of the user the terminal on the barcode 60 installed at taxi station information board of the station, the photographing unit 11 photographs image of the barcode and transform the barcode image to digital image data to transmit the digital image data to the decoder 13.

Next, the terminal 10 extracts the code information at step S1610. The decoder 13 of the user terminal 10 analyzes the digital image data of the barcode 60 received from the photographing unit 11 to obtain the code information.

As described above, the code information includes the service identifier 61, the station location information 63 and the information 65 about transportation service provider server, but may not include the information 65 about transportation service provider server, in case that there are a plurality of transportation service providers.

The user terminal 10 transmits the obtained code information to the service provider server 1330 at step S1620. The transmitting/receiving unit 19 transmits the user content request message 90, including the code information received from the decoder 13, to the service provider server 130 in response of transmitting/receiving control signal of the control unit.

The service provider server 1330 analyzes the service identifier 61 included in the received taxi call message and recognizes of service type at step S1630. If the recognized service type is the taxi call service, the service provider server 1330 extracts the station location information and the information about transportation service server corresponding to the received code information with reference to the index database at step S1650. If the recognized service type is not the taxi call service, the service provider server 1330 processes procedure corresponding to the recognized service at step S1640.

The service provider server 1330 transmits the taxi call message, including the extracted station location information, to the transportation service provider server 1340.

The transportation service provider server 1340 detects location of taxis, which belongs to the transportation service provider, based on the received taxi call message at step S1660. As described above, the taxi, which belongs to the transportation service provider, includes communication terminal, and the transportation service provider server 1340 finally detects the location of the taxi terminal 1350 by one of location tracing methods described above at step S1660.

The transportation service provider server 1340 detects the nearest taxi terminal 1350 from the station location based on the detected location information on taxi terminal 1350, and transmits the taxi call message, including the station location information, to the taxi terminal 1350 at step S1670.

The transportation service provider server 1340 transmits a taxi call acknowledgement message to the user terminal 10, if the taxi call is done successfully, to notify that the taxi call request was served at step S1680. The taxi call acknowledgement message may include information on arrival prediction time. Also, the taxi terminal can transmit the taxi call acknowledgement message to the user 10 directly.

Figure 17:
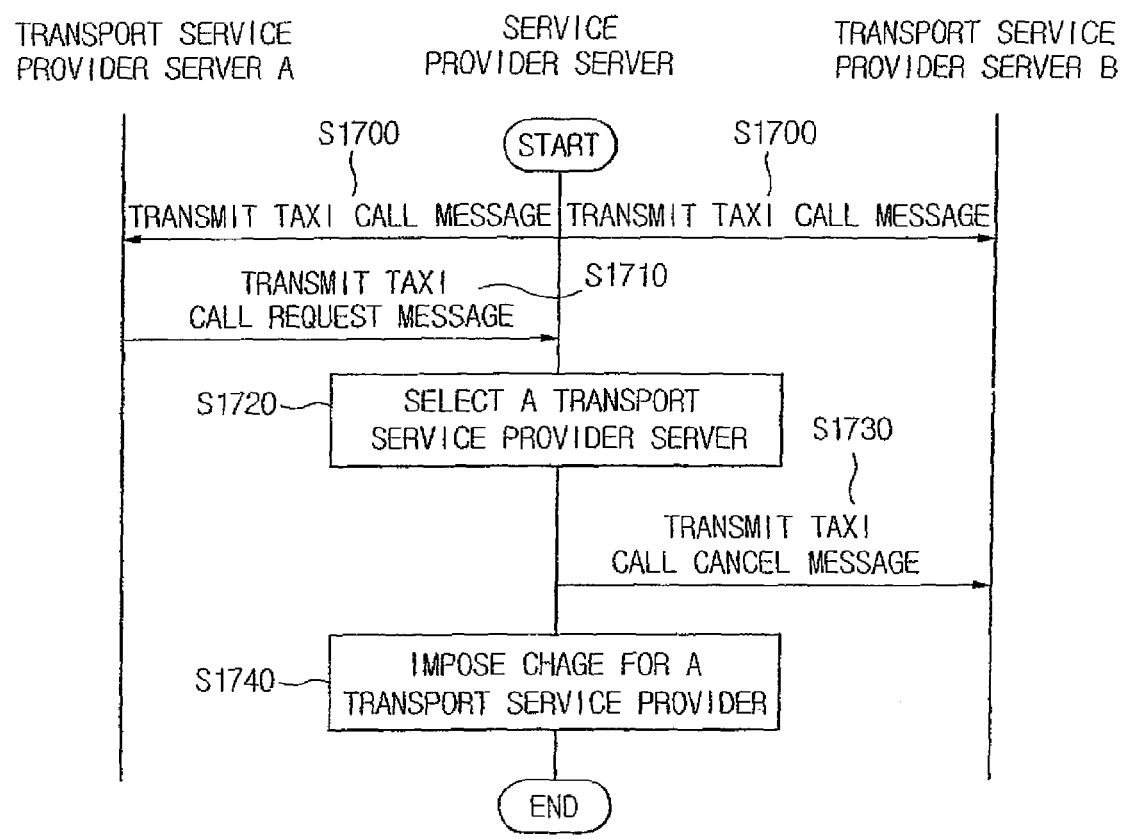
FIG. 17 is a detail flowchart of the step S1655, in case that there are a plurality of transportation service providers.

FIG. 17 is a detail flowchart of the step S1655, in case that there are a plurality of transportation service providers.

The service provider server 1330 transmits the taxi call message which includes the station location information extracted from the code information, received from the user terminal 10, to a plurality of transportation service provider servers 1340 at step 1700.

If the service provider server 1330 receives taxi call request message from one of a plurality of transportation service provider servers, for example, receives taxi call request message from A transportation service provider server 1340 at the first at step S1710, the service provider server 1330 selects the A transportation service provider server 1340 as the assigned transportation service provider at step S1720

If the assigned transportation service provider is selected, the service provider server 1330 transmits taxi call cancel message to the other transportation service provider server(s) 1340 (for example, B transportation service provider server in FIG. 17) at step 1730. If the taxi call service is completed, the service provider server 1330 does billing procedure for the A transportation service provider server 1340 at step S1740.

Figure 18:
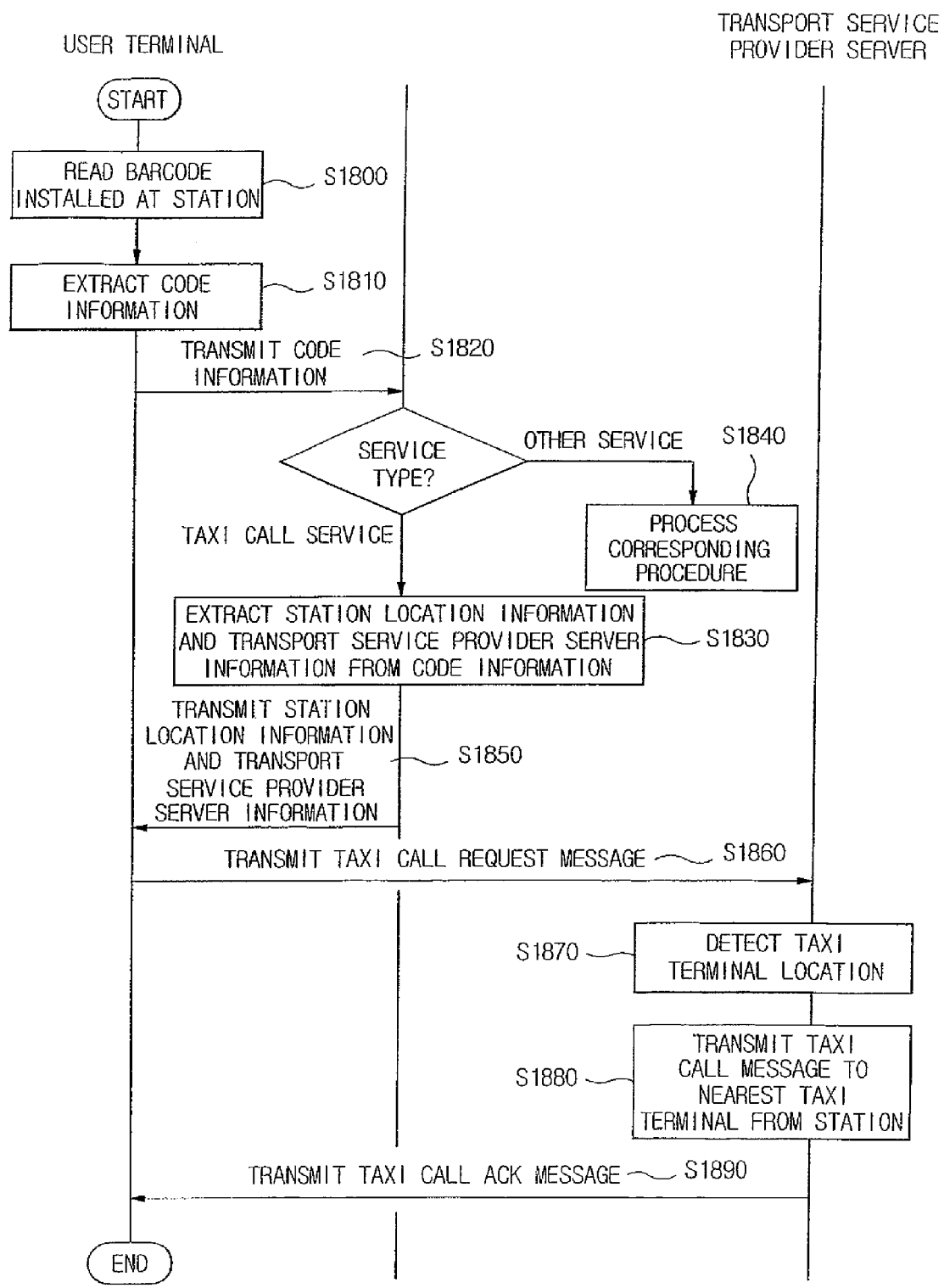
FIG. 18 is a flowchart of a method of providing taxi call service using a barcode according to a seventh embodiment of the present invention.

FIG. 18 is a flowchart of a method of providing taxi call service using a barcode according to a seventh embodiment of the present invention.

First, the terminal 10 reads the barcode 60 installed at station at step S1800. As described above, a user goes to the station to catch a taxi and set the terminal 10 in barcode recognizing mode and then moves the photographing unit 11 of the user the terminal on the barcode 60 installed at taxi station information board of the station, the photographing unit 11 photographs image of the barcode and transform the barcode image to digital image data to transmit the digital image data to the decoder 13.

Next, the terminal 10 extracts the code information at step S1810. The decoder 13 of the user terminal 10 analyzes the digital image data of the barcode 60 received from the photographing unit 11 to obtain the code information.

As same as the sixth embodiment of the present invention, the code information includes the service identifier 61, the station location information 63 and the information 65 about transportation service provider server, but may not include the information 65 about transportation service provider server, in case that there are a plurality of transportation service providers.

The user terminal 10 transmits the extracted code information to the service provider server 1330 at step S1820. The transmitting/receiving unit 19 transmits the user content request message 90, including the code information received from the decoder 13, to the service provider server 1330 in response of transmitting/receiving control signal of the control unit.

The service provider server 1330 analyzes the service identifier 61 included in the received taxi call message to recognize service type. If the recognized service type is the taxi call service, the service provider server 1330 extracts the station location information and the information about transportation service server 1340 corresponding to the received code information with reference to the index database at step S1830. If the recognized service type is not the taxi call service, the service provider server 1330 processes procedure corresponding to the recognized service at step S1840.

The service provider server 1330 transmits the extracted station location information and the transportation service provider information to the user terminal 10 at step S1850, and then the user terminal 10 transmits the taxi call message, including the station location information to the transportation service provider server 1340 corresponding to the transportation service provider information at step at step S1860.

The transportation service provider server 1340 detects location of taxis, which belongs to the transportation service provider, based on the received taxi call message at step S1870. As same as the sixth embodiment of the present invention, the taxi, which belongs to the transportation service provider, includes communication terminal, and the transportation service provider server 1340 detects the location of the taxi terminal 1350 by one of location tracing methods described above and finally detects the location of the taxi.

The transportation service provider server 1340 detects the nearest taxi terminal 1350 from the station location based on the detected location information on taxi terminal 1350, and transmits the taxi call message, including the station location information, to the taxi terminal 1350 at step S1880.

The transportation service provider server 1340 transmits a taxi call acknowledgement message to the user terminal 10, if the taxi call is done successfully, to notify that the taxi call request was served at step S1890. The taxi call acknowledgement message may include information on arrival prediction time. Also, the taxi terminal can transmit the taxi call acknowledgement message to the user 10 directly.

Although it's not shown separately, the seventh embodiment of the present invention can include the procedures as shown in FIG. 17, in case that there are a plurality of transportation service providers.

Figure 19:
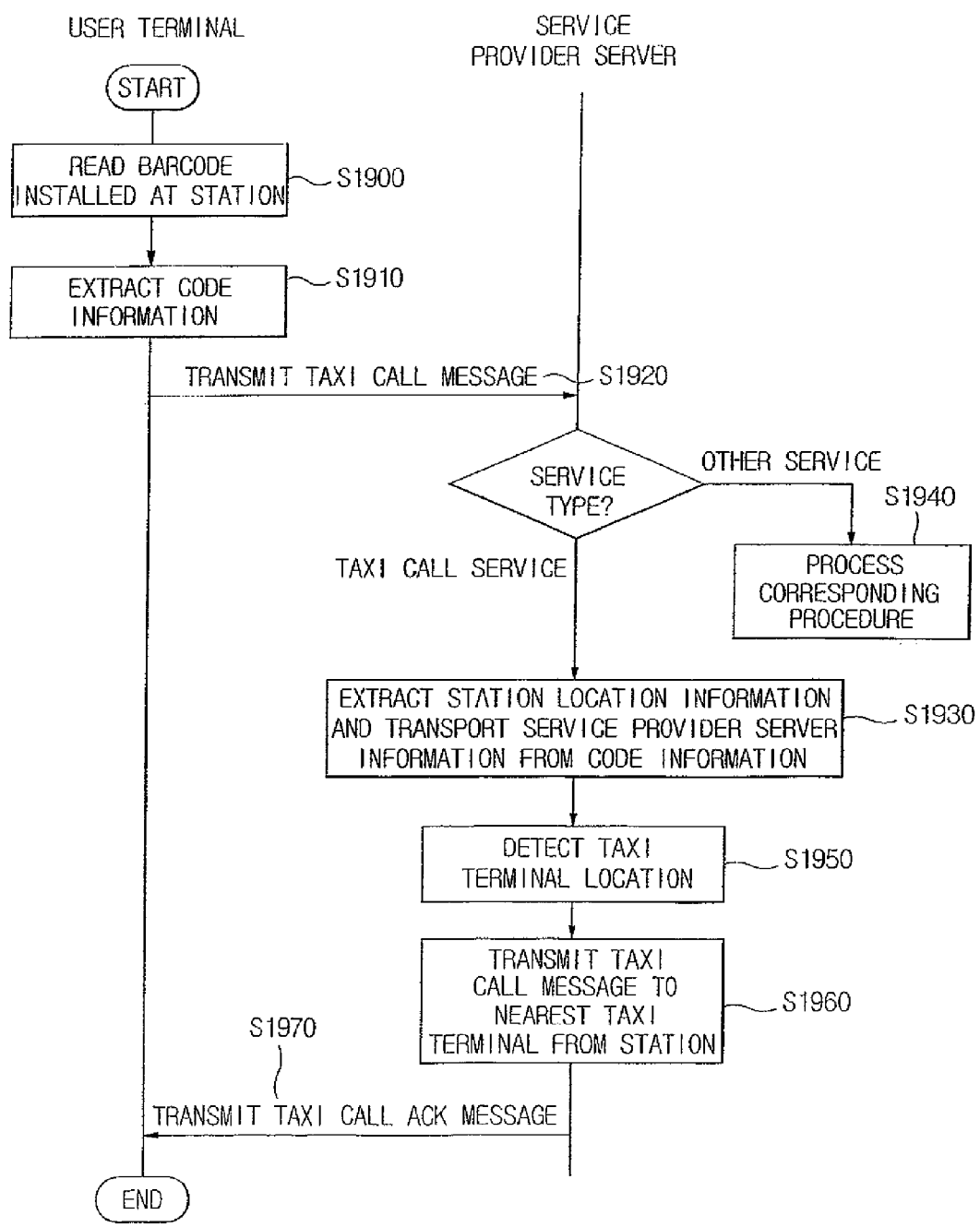
FIG. 19 is a flowchart of a method of providing taxi call service using a barcode according to an eighth embodiment of the present invention.

FIG. 19 is a flowchart of a method of providing taxi call service using a barcode according to a eighth embodiment of the present invention.

First, the terminal 10 reads the barcode 60 installed at station at step S1900. As described above, a user goes to the station to catch a taxi and set the terminal 10 in barcode recognizing mode and then moves the photographing unit 11 of the user the terminal on the barcode 60 installed at taxi station information board of the station, the photographing unit 11 photographs image of the barcode and transform the barcode image to digital image data to transmit the digital image data to the decoder 13.

Next, the terminal 10 extracts the code information at step S1910. The decoder 13 of the user terminal 10 analyzes the digital image data of the barcode 60 received from the photographing unit 11 to obtain the code information.

As not same as the first embodiment of the present invention, the code information includes the service identifier 61 and the station location information 63 but does not include the information 65 on transportation service provider server.

The user terminal 10 transmits the extracted code information to the service provider server 1330 at step S1920. The transmitting/receiving unit 19 transmits the user content request message 90, including the code information received from the decoder 13, to the service provider server 1330 in response of transmitting/receiving control signal of the control unit.

The service provider server 1330 analyzes the service identifier 61 included in the received taxi call message to recognize service type. If the recognized service type is the taxi call service, the service provider server 1330 extracts the station location information and the information about transportation service server 1340 corresponding to the received code information with reference to the index database at step S1930. If the recognized service type is not the taxi call service, the service provider server 1330 processes procedure corresponding to the recognized service at step S1940.

The service provider server 1330 detects the location of the taxi terminal 1350 by one of location tracing methods described above and finally detects the location of the taxi at step S1950. As described above, in case that the web server which the communication service provider operates is the service provider server, the service provider server 1330 can easily trace the present location of the taxi terminal 1350 by Cell ID which is location tracing method using mobile communication network 20.

The service provider server 1330 detects the nearest taxi terminal 1350 from the station location based on the detected location information on taxi terminal 1350, and transmits the taxi call message, including the station location information, to the taxi terminal 1350 at step S1960.

The service provider server 1330 transmits a taxi call acknowledgement message to the user terminal 10, if the taxi call is done successfully, to notify that the taxi call request was served at step S1970. The taxi call acknowledgement message may include information on arrival prediction time. Also, in case of the seventh embodiment of the present invention as same as the fifth and the sixth embodiments of the present invention the taxi terminal can transmit the taxi call acknowledgement message to the user 10 directly.

The embodiments of the present invention described above have been disclosed that the barcode at taxi station is read. But, those skilled in the art will appreciate that various modifications, additions and substitutions are possible, without departing from the scope and spirit of the invention. For example, it is possible that the barcode can be installed at any places such as public telephone booth, the entrance of subway, bus stop and etc, and the taxi call service can be provided using the barcode installed at any places.

In this embodiment, it has been described for an example of taxi call service. However, it is natural that the present invention can be applied to various call services, such as express parcel service, motorcycle delivery service, delivery service, etc.

Figure 20:
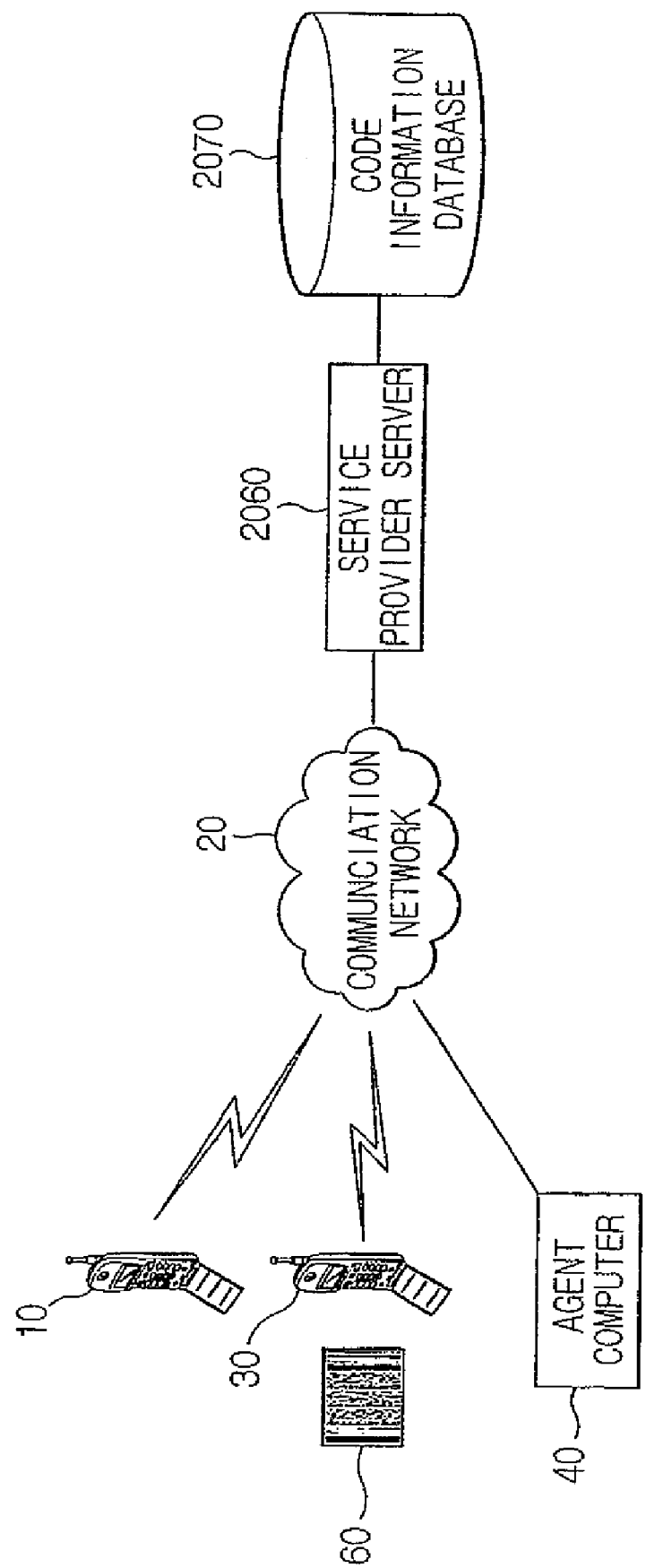
FIG. 20 is a construction view of the system for providing personal contact information using a barcode 60 according to one embodiment of the present invention.

FIG. 20 is a construction view of the system for providing personal contact information using a barcode 60 according to one embodiment of the present invention.

As shown in FIG. 20, the system for providing personal contact information using the barcode 60 according to the present invention comprises a user terminal 10, a predetermined terminal 30, a agent computer 40 and a service provider server 2060.

The user terminal 10 and the predetermined terminal 30, which are mobile communication terminals connected to the service provider server 2060 through a communication network 20 including a wireless communication network and a wired communication network, transmits and receives information to and from the service provider 2060 through the communication network 20. A wireless communication terminal, such as a mobile terminal, a Personal Communications Service (PCS) and a Personal Digital Assistant (PDA), can be used as the user terminal 10.

The terminals 10, 30 used in the present invention have a function of reading and decoding the barcode 60, so that the terminals 10, 30 read the barcode 60 recorded on a business card, extracts code information recorded on the barcode 60, and transmits the extracted code information to the service provider 2060 through the communication network 20. The detailed construction of each terminal 10, 30 were descried with reference to FIG. 3. Further, a Personal Computer (PC) or a notebook computer, as well as the mobile terminal, can be used as the terminals 10,30.

The agent computer 40 is connected to the service provider server 2060 through a network using TCP/IP or PPP. Internet, LAN and MAN belong to the network. Internet is most generally used. The agent computer 40 is used when a user want to get the barcode 60 through it on-internet. The agent computer 40 includes a barcode issue machine, so issues the business card, in which the barcode 60 is recorded, by recording the barcode 60 generated by the service provider server 2060 on a predetermined part of the business card.

The service provider server 2060 is a computer provided in a service provider that provides the service for providing user contact information of the present invention, receives a barcode issue request message from the user terminal 10 using the communication network 20, generates and transmits the barcode 60 corresponding to the barcode issue request message to the user terminal 10. Furthermore, the service provider server 2060 receives user contact information request message including the code information, which is generated by decoding the barcodes 60, from the predetermined terminal 30 and extracts user contact information by analyzing the code pattern and transmits the user contact information to the predetermined terminal 30. In this case, the service provider server 2060 may be the computer of a service provider independent from a communication service provider (not shown) that provides the communication network 20, or the computer of a communication service provider if the communication service provider personally provides the service using the communication network 20 and the computer thereof.

Figure 21:
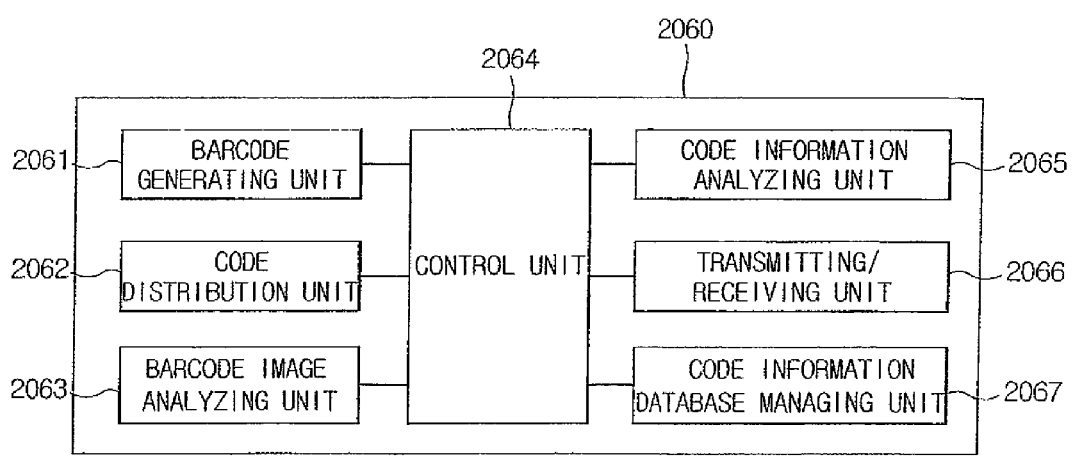
FIG. 21 is a block diagram showing the internal construction of the service provider server of FIG. 20.

FIG. 21 is a block diagram showing the internal construction of the service provider server 2060 of FIG. 20. As shown in FIG. 21, the service provider server 2060 includes a barcode generating unit 2061, a code distribution unit 2062, a barcode image analyzing unit 2063, a code information analyzing unit 2065, a transmitting/receiving unit 2066, a code information database managing unit 2067 and a control unit 2064.

The barcode generating unit 2061 is adapted to generate the barcode 60 including user contact information which is included in the barcode issue request message received from the user terminal 10.

The barcode generating unit 2061 generates the code information by codes the user contact information, and then generates a barcode image 1005 corresponding to the code information. In this case, the user contact information can be telephone number, home address, office address, e-mail address and homepage's address. That is, the barcode generating unit 2061 converts these user contact information into binary codes to create a 2-dimensional barcode image.

The code distribution unit 2062, adapted to analyze a service identifier 2221 included in a user contact information request message 2220 received from the predetermined terminal 30 to classify service types, analyzes the service identifier 1001, recognizes that the service type is a user contact information providing service, and transmits the received barcode image or code information 2225 to the barcode image analyzing unit 2063 and the code information analyzing unit 2065 according to embodiments.

The barcode image analyzing unit 2063 is adapted to receive the barcode image photographed by a photographing unit 11, extract code information 2225 from the barcode image and transmit the code information to the code information analyzing unit 2065, in a case where a decoder 13 for decoding the barcode 60 is not provided in the predetermined terminal 30.

The code information analyzing unit 2065 functions to analyze the code information received from the barcode image analyzing unit 2063 and extract the user contact information from the analyzed code information. The code information analyzing unit 2065 extracts the user contact information corresponding to the code information with reference to a code information database 2070 storing therein the user contact information corresponding to the received code information.

The transmitting/receiving unit 2066 functions to receive the barcode issue request message from the user terminal 10 and transmit the generated barcode to the user terminal 10. And the transmitting/receiving unit 2066 functions to receive the user contact information request message from the predetermined terminal 30 and transmit the extracted user contact information to the predetermined terminal 30.

The code information database managing unit 2067 functions to manage the code information database 2070 storing therein personal connection 정보corresponding to code information.

The control unit 2064 is adapted to control the respective components, and operated to generate a barcode generating control signal corresponding to the received barcode issue request message, transmits the barcode generating control signal to the barcode generating unit 2061, generates a user contact information extracting control signal corresponding to the received user contact information request message and transmits the user contact information extracting control signal to the code information analyzing unit 2065.

The detail construction of the user terminal 10 is same as described above in relation to FIG. 3. But, the user interface unit 17 functions to provide the user interface so as to allow the user to access to the service provider server 2060 in order to get issued the barcode 60, in which user contact information is recorded, or in order to receive user contact information by reading the barcode 60 displayed on a business card or computer screen and by transmit the decoded code information. The transmitting/receiving unit 19 functions to transmit the user connection request message 2220, including the code information received from the decoder 13, to the service provider server 2060. Further, the transmitting/receiving unit 19 transmits a barcode issue request message including user contact information, to the service provider server 2060 at a barcode issuing step.

Figure 22:
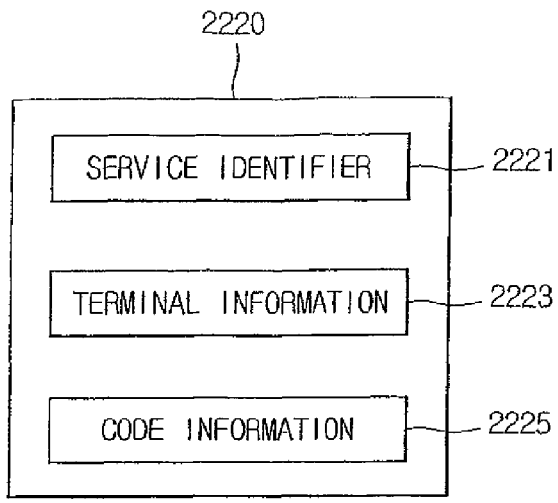
FIG. 22 is a view conceptually showing the data configuration of the user contact information request message.

FIG. 22 is a view conceptually showing the data configuration of the user contact information request message 2220.

As shown in FIG. 22, in the user contact information request message 2220, a service identifier 2221, terminal information 2223 and code information 2225 are recorded.

The service identifier 2221 is a part in which a service type the service provider server 2060 should provide is recorded. The service provider server 2060 can provide a plurality of services, which can be provided using the barcode 60, such as the user contact information providing service, the taxi call service, the advertising service, the commodity purchase connecting service. For example, four bits are allocated to the service identifier 2221, so that 0001, 0010, 0011 and 0100 can be used as identifiers to represent the taxi call service, the advertising service, the purchase connection service, and the user contact information providing service, respectively. In this case, the number of bits allocated to the service identifier 2221 can be properly changed depending on the types of services which the service provider server 2060 provides or if necessary.

The terminal information 2223 is the phone number of the predetermined terminal 30.

The code information 2225 is generated by decoding the barcode 60 in the decoder 13 in the predetermined terminal 30, and includes data related to the user contact information. In this case, the user contact information is information source to make a contact with the user. The user contact information can be telephone number, home address, office address, e-mail address and homepage's address.

Figure 23:
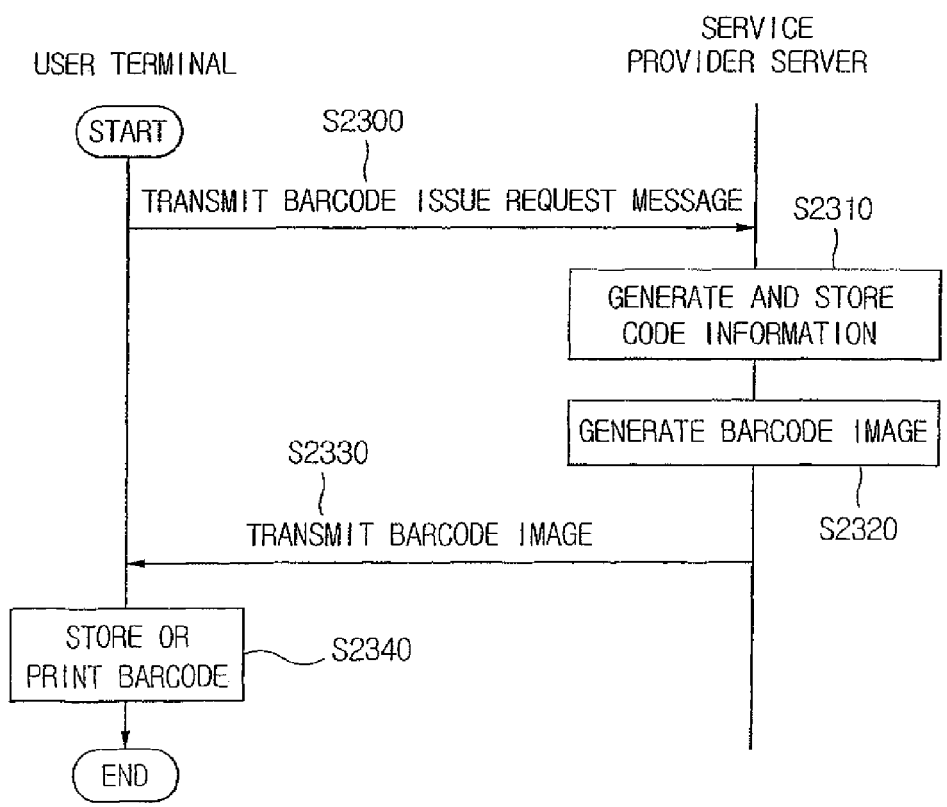
FIG. 23 is a flowchart of a barcode issue procedure by accessing the service provider server through the user terminal.

FIG. 23 is a flowchart of a barcode issue procedure by accessing the service provider server 2060 through the user terminal 10.

First, the user terminal 10 transmits the barcode issue request message including itself connection information to the service provider server 2060 at step S2300. As described above, the connection information may be name, address, phone number, e-mail address, homepage address.

The service provider server 2060 generates the code information by coding the user contact information included in the received barcode issue request message at step S2310, and generates the barcode image corresponding to the code information at step S2320. That is, the barcode generating unit 2061 of the service provider server 2060 generates two dimensional barcode by transforming the connection information such as name, address, telephone number, home address, office address, e-mail address and homepage's address to binary code.

If the barcode image is generated, the service provider server 2060 transmits the generated barcode image to the user terminal 10 at step S2330. Or the service provider server 2060 can transmit the barcode image to pre-designated e-mail, in case that the user the designated the e-mail receive the barcode image.

The user terminal 10 stores the received barcode image in memory at step S2340. The user transmits the stored barcode image to a computer or prints out the stored barcode image, thus uses the stored barcode as an electronic business card or attaches the printed barcode 60 to a business card and makes a call or makes a access to homepage by reading barcode.

Figure 24:
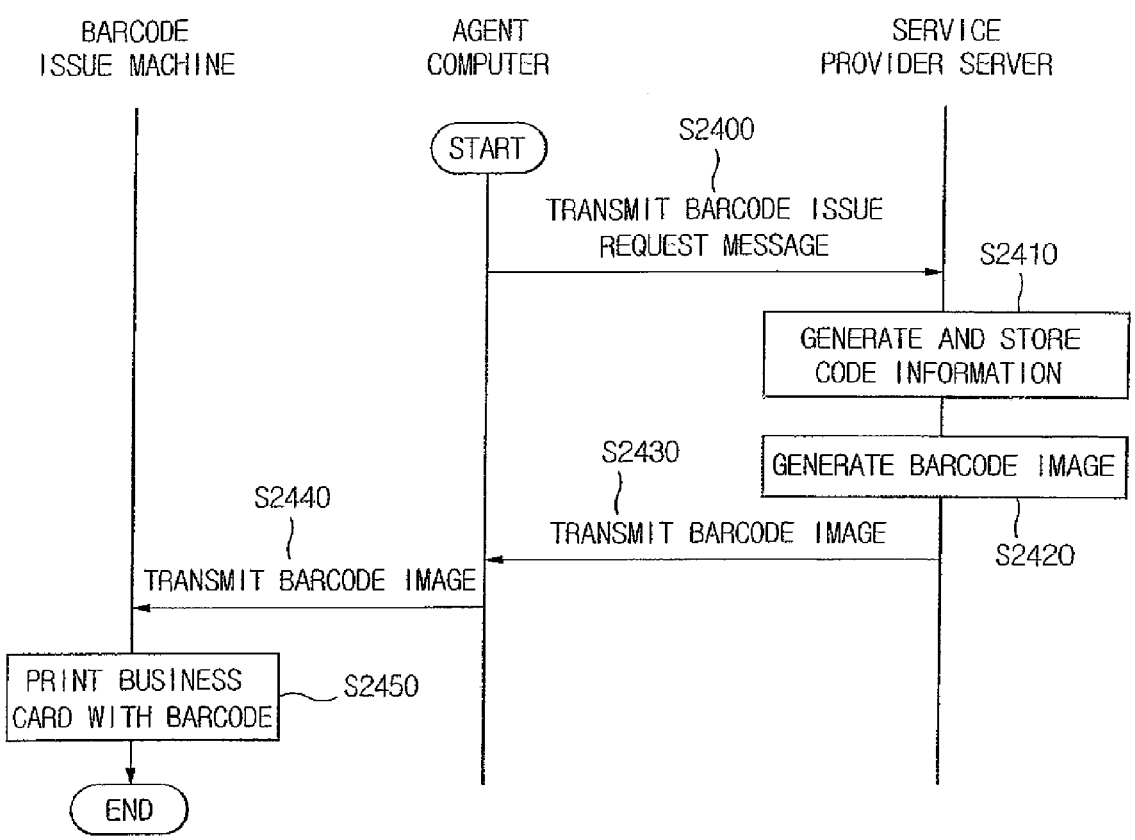
FIG. 24 is a flowchart of a business card, in which the barcode is recorded, issue procedure by accessing the service provider through the agent computer.

FIG. 24 is a flowchart of a business card, in which the barcode is recorded, issue procedure by accessing the service provider server 2060 through the agent computer 40.

First, the agent computer 40 transmits the barcode issue request message including user contact information received from the user to the service provider server 2060 at step S2400. As described above, the user contact information may be name, address, phone number, e-mail address, homepage address.

The service provider server 2060 generates the code information by coding the user contact information included in the received barcode issue request message at step S2410, and generates the barcode image corresponding to the code information at step S2420. That is, the barcode generating unit 2061 of the service provider server 2060 generates two dimensional barcode to binary code by transforming the connection information such as name, address, telephone number, home address, office address, e-mail address and homepage's address.

If the barcode image is generated, the service provider server 2060 transmits the generated barcode image to the agent computer 40 at step S2430. The agent computer 40 stores the received barcode image in memory and transmits the received barcode image to a barcode issue machine at step S2440. The barcode issue machine completes the business card, in which the barcode 60 is recorded, by recording the received barcode image in a predetermined part of the printed business card at step S2450.

Figure 25:
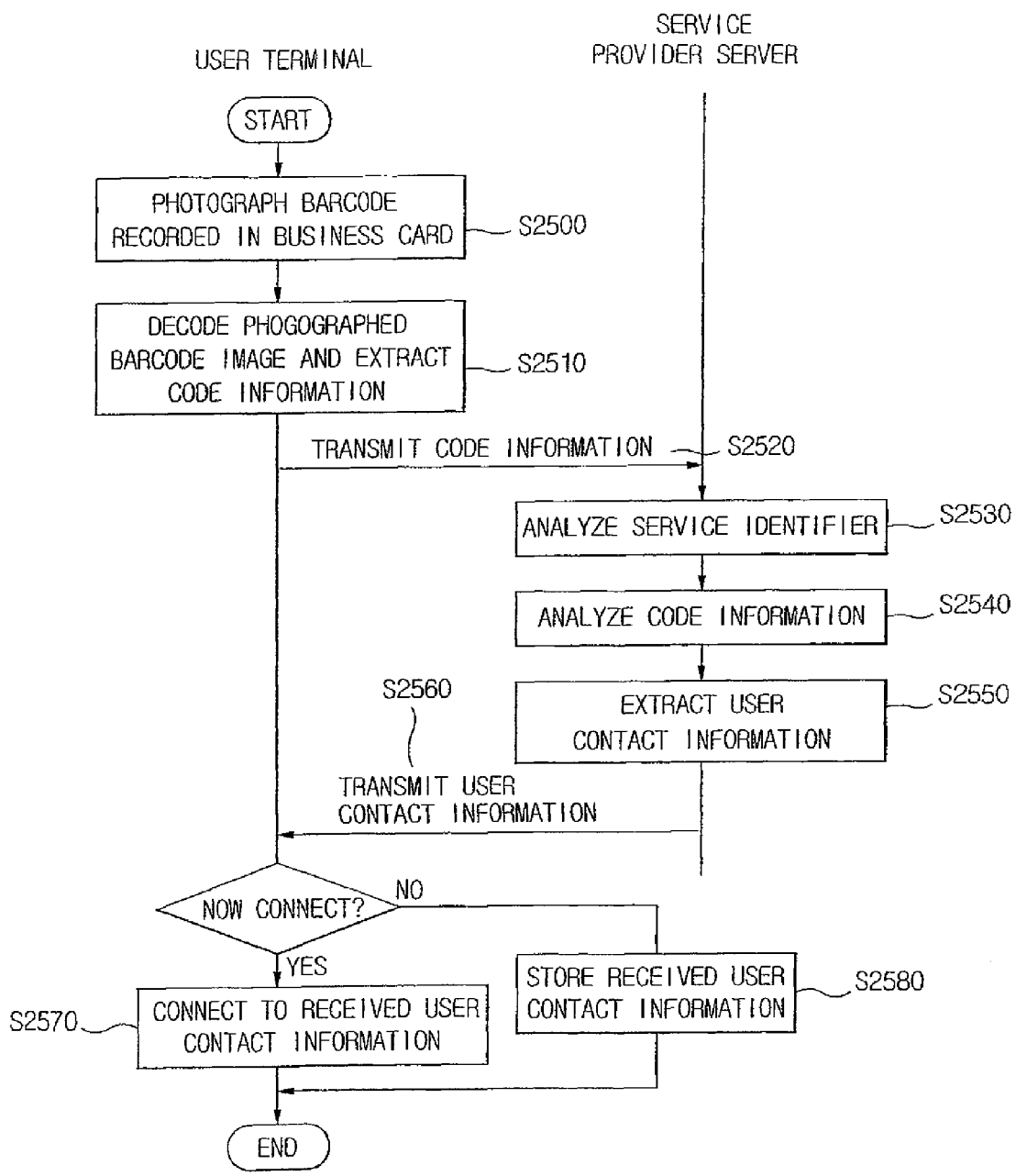
FIG. 25 is a flowchart of a method of providing personal contact information using a barcode according to a ninth embodiment of the present invention.

FIG. 25 is a flowchart of a method of providing personal contact information using a barcode according to a ninth embodiment of the present invention. The ninth embodiment of the present invention is a case that the decoder 13 is included in the predetermined terminal 30.

First, the predetermined terminal 30 photographs the barcode 60 recorded in the business card at step S2500. For example, the predetermined terminal user photographs the barcode part of the business card using the photographing unit 11, such as a camera provided in the terminal, by pressing a photographing button after selecting a barcode menu on the predetermined terminal 30.

The decoder 13 provided in the predetermined terminal 30 decodes the photographed barcode image and extracts the code information at step S2510, and then transmits the user contact information request message including the code information to the service provider server 2060 at steps S2520.

The service provider server 2060 analyzes a service identifier 2221 included in the received connection information request message at step S2530. That is, the code distribution unit 2062 in the service provider server 2060 recognizes that a service type is the connection information providing service by analyzing the service identifier 2221, and transmits the code information 2225 to the code information analyzing unit 2065.

The code information analyzing unit 2065 analyzes the received code information and extracts the user contact information at steps S2540 and S2550. That is, the code information analyzing unit 2065 extracts the user contact information corresponding to the received code information 2225 from the code information database 2070 with reference to the code information database 2070.

The service provider server 2060 transmits the extracted user contact information to the predetermined terminal 30 at step S2560.

Some messages, for example a storing menu and connecting menu, are displayed that ask to the predetermined terminal user whether he(she) wants to store the user contact information after it is displayed and whether he(she) wants to be accessed to the selected user contact information while it is stored, on screen of the predetermined terminal 30 received user contact information. If the user selects the user contact information to which he(she) wants to be accessed, and selects the connecting menu, he(she) is accessed to the selected user contact information while it is stored at step S2570. If the user selects the storing menu, the user contact information is stored at step S2580.

Figure 26:
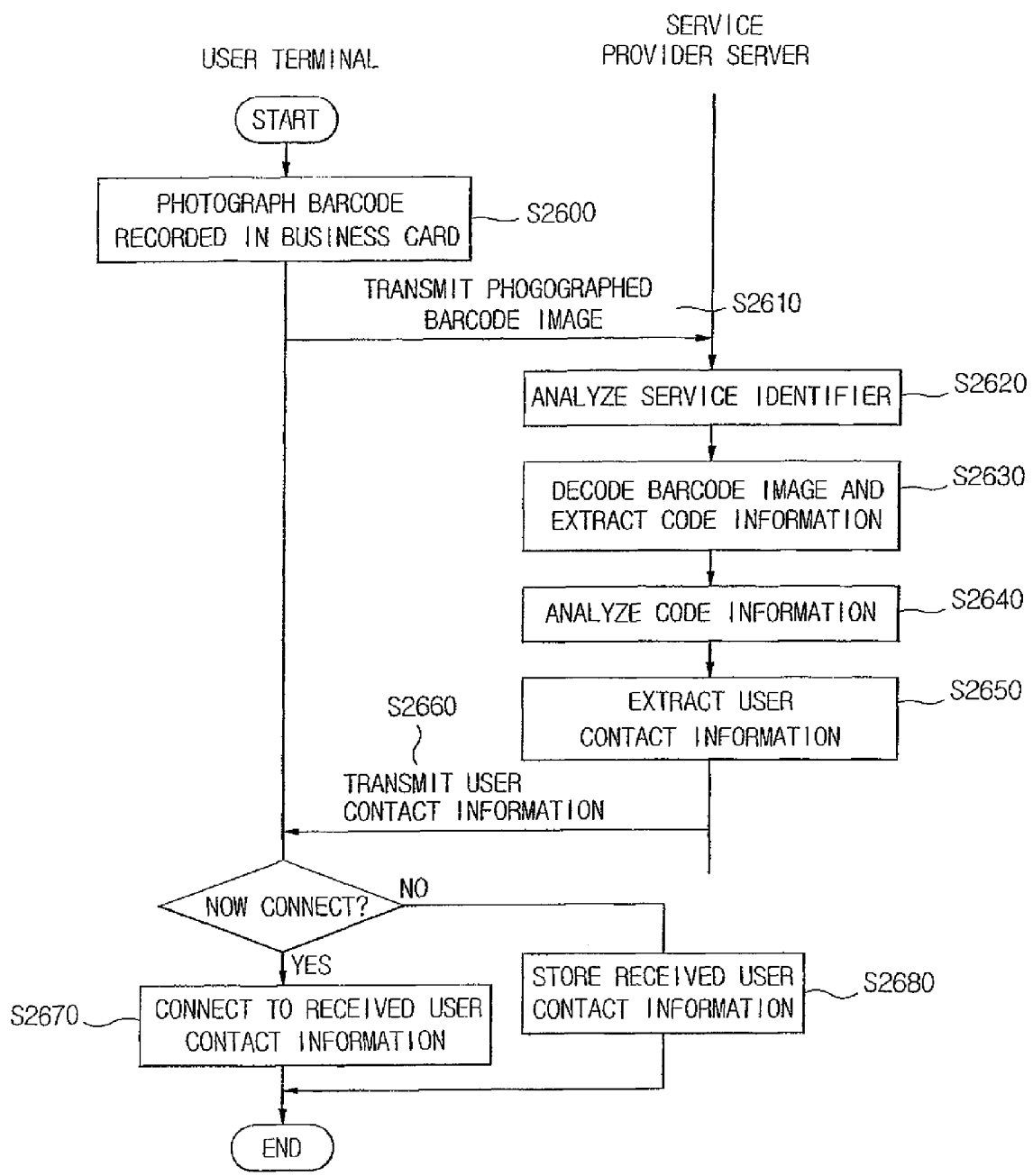
FIG. 26 is a flowchart of a method of providing personal contact information using a barcode according to a tenth embodiment of the present invention.

FIG. 26 is a flowchart of a method of providing personal contact information using a barcode according to a tenth embodiment of the present invention. The tenth embodiment of the present invention is a case that the decoder 13 is not included in the predetermined terminal 30.

First, the predetermined terminal 30 photographs the barcode 60 recorded in the business card at step S2600. For example, the predetermined terminal user photographs the barcode part of the business card using the photographing unit 11, such as a camera provided in the terminal, by pressing a photographing button after selecting a barcode menu on the predetermined terminal 30.

The predetermined terminal 30 transmits the user contact information request message including the code information to the service provider server 2060 at step S2610.

The service provider server 2060 analyzes a service identifier 2221 included in the received connection information request message at step S2620. That is, the code distribution unit 2062 in the service provider server 2060 recognizes that a service type is the connection information providing service by analyzing the service identifier 2221, and transmits the barcode image code included in the received connection information request message to the barcode image analyzing unit 2063.

The barcode image analyzing unit 2063 analyzes the received barcode image and extracts the code information 2225, and then transmits the code information 2225 to the code information analyzing unit 2065.

The code information analyzing unit 2065 extracts the user contact information corresponding to the received barcode image from the code information database 2070 with reference to the code information database 2070 at steps S2640 and S2650. The service provider server 2060 transmits the extracted user contact information to the predetermined terminal 30 at step S2660.

Some messages, for example a storing menu and connecting menu, are displayed that ask to the predetermined terminal user whether he(she) wants to store the user contact information after it is displayed and whether he(she) wants to be accessed to the selected user contact information while it is stored, on screen of the predetermined terminal 30 received user contact information. If the user selects the user contact information to which he(she) wants to be accessed, and selects the connecting menu, he(she) is accessed to the selected user contact information while it is stored at step S2670. If the user selects the storing menu, the user contact information is stored at step S2680.

In the tenth embodiment of the present invention, the barcode image analyzing unit 2063 analyzes the code information 2225 from the barcode image and transmits the code information 2225 to the code information analyzing unit 2065. But it's possible that the barcode image analyzing unit 2063 extracts the user contact information from the barcode image directly.

Figure 27:
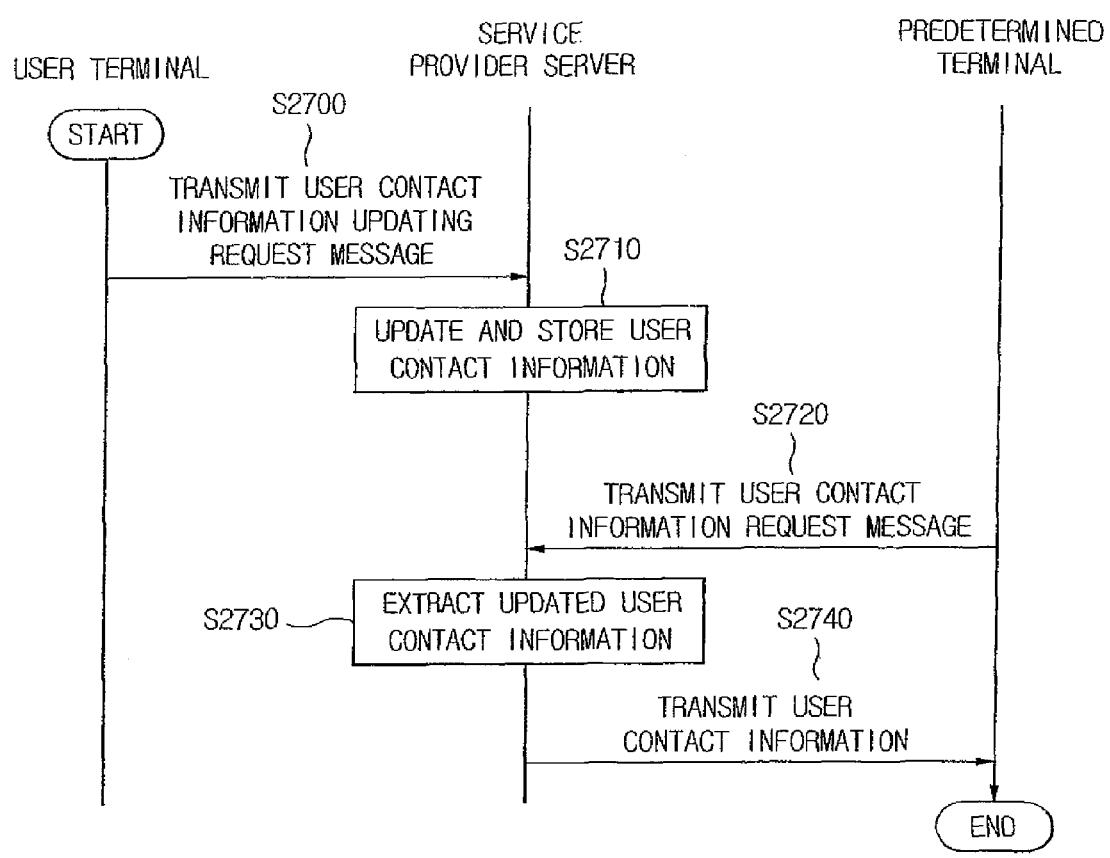
FIG. 27 is a flowchart that updating procedure of the user contact information and providing procedure of the updated user contact information are shown.

FIG. 27 is a flowchart that updating procedure of the user contact information and providing procedure of the updated user contact information are shown.

As shown in FIG. 7, the user terminal 10 transmits the user contact information updating request message to the service provider server 2060 at step S2700. That is, the user transmits the changed connection information to the service provider server 2060 and requests the updating of the user contact information, in case that the user contact information, such as telephone number or e-mail, has changed.

The service provider server 2060 extracts the user contact information included in the received user contact information updating request message, and then updates user contact information by deleting the user contact information stored in the code information database and storing the extracted user contact information in the code information database newly at step S2710.

The predetermined terminal 30 photographs the code pattern 60 installed at business card and decodes the code pattern, and then transmits the user contact information request message including the code information 2225 to the service provider server 2060 at step S2720.

Finally, the service provider server 2060 analyzes the received code information 2225 to extract the user contact information corresponding the code information 2225 from the code information database 2070 at step S2730, and transmits the user contact information to the predetermined terminal 30 at step S2740. According to the predetermined terminal user's choice, the predetermined terminal 30 can access to the received user contact information(for example making a call or accessing to homepage etc) or store the user contact information in memory.

Figure 28:
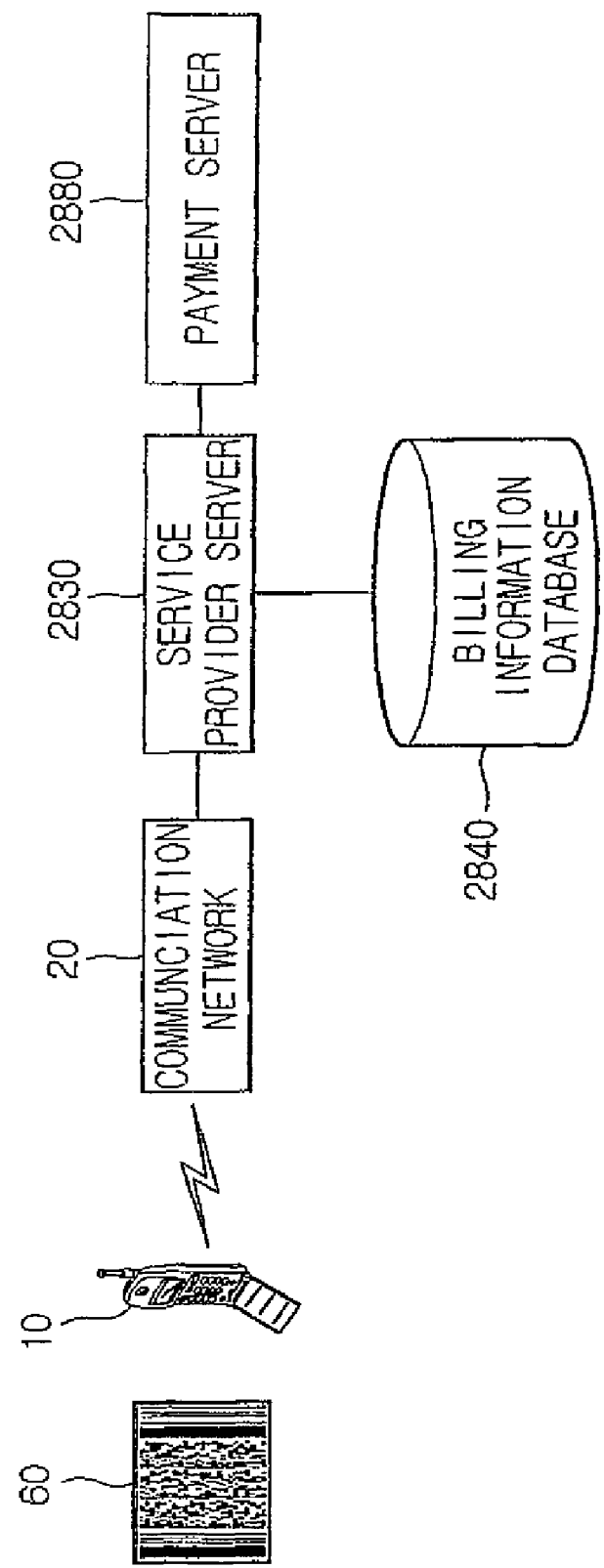
FIG. 28 is the first construction view of a billing system using a code pattern according to one embodiment of the present invention.

FIG. 28 is the first construction view of a billing system using a code pattern according to one embodiment of the present invention.

As shown in FIG. 28, the first construction view of a billing system using a code pattern according to the present invention comprises a user terminal 10, a service provider server 2830 and a billing server 2880.

The user terminal 10, which is mobile communication terminal connected to the service provider server 2830 through a communication network 20 including a wireless communication network and a wired communication network, transmits and receives information to and from the service provider 2830 through the communication network 20. A wireless communication terminal, such as a mobile terminal, a Personal Communications Service (PCS) and a Personal Digital Assistant (PDA), can be used as the user terminal 10. The user terminal 10 used in the present invention has a function of reading and decoding the barcode 60, so that the user terminal 10 reads the barcode 60 installed at one side of a GIRO paper to extract billing information and the service provider server information recorded on the barcode 60, and accesses to the service provider 2830 and requests payment service.

The service provider server 2830 is a computer provided in a service provider that provides the payment service using the code pattern according to the present, receives a payment request message 3200 from the user terminal through the communication network 20 and processes the payment transaction corresponding to the payment request message. In this case, the service provider server 2830 may be the computer of a service provider independent from a communication service provider (not shown) that provides the communication network 20, or the computer of a communication service provider if the communication service provider personally provides the service using the communication network 20 and the computer thereof. And in this case, the service provider server 2830 can process the payment transaction directly related to itself or provide payment service for other payment requestor. In the latter case, it is preferred that the service provider server 2830 should receives payer information and the billing information from the payment requester and store them in memory.

Figure 29:
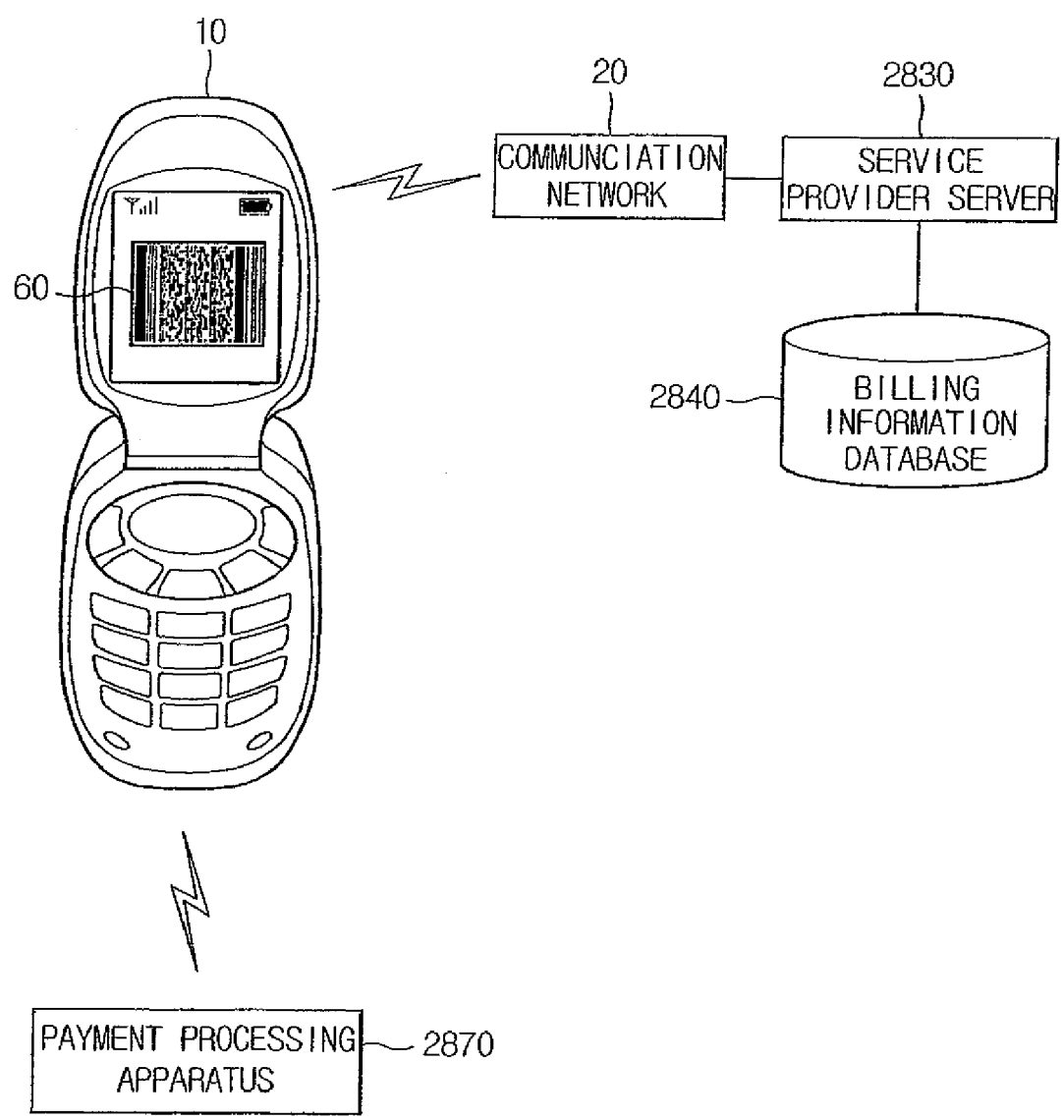
FIG. 29 is the second construction view of a billing system using a code pattern according to one embodiment of the present invention.

FIG. 29 is the second construction view of a billing system using a code pattern according to one embodiment of the present invention.

As shown in FIG. 29, the second construction view of a billing system using a code pattern according to the present invention comprises the user terminal 10, the service provider server 2830 and a payment processing apparatus 2870.

The user terminal 10 transmits the barcode issue request message for get issued the barcode 60, in which billing information is recorded, to the service provider server 2830.

The service provider server 2830 generates the barcode corresponding to the barcode issue request message received from the user terminal 10, and transmits the barcode to the user terminal 10.

The payment processing apparatus 2870 functions to do payment processing by reading the barcode 60 displayed on the user terminal screen, may be ATM or CD apparatus provided in bank. The detailed construction of the payment processing apparatus 2870 is described later with reference to FIG. 31.

Figure 30:
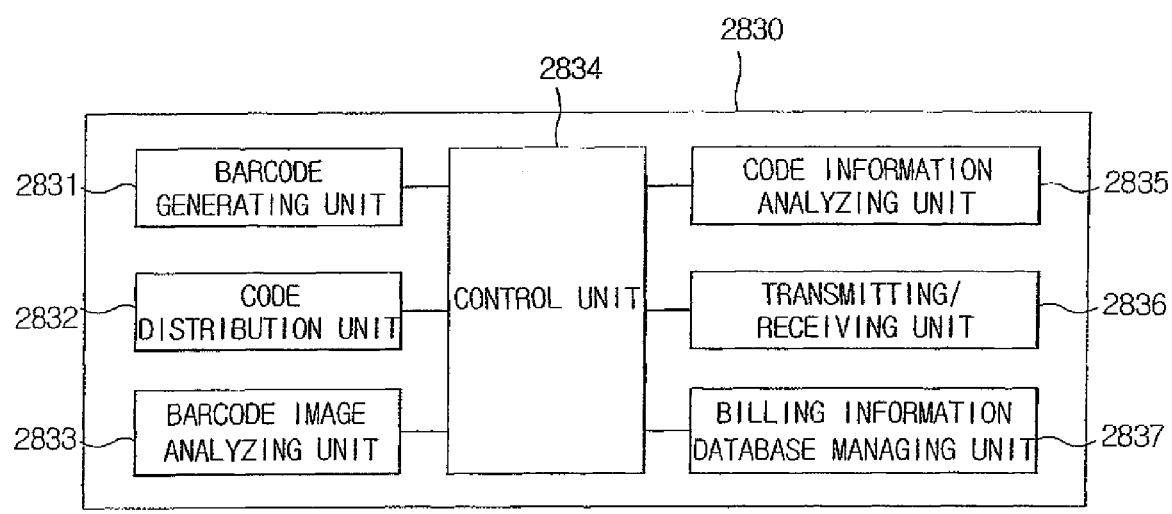
FIG. 30 is a block diagram showing the internal construction of the service provider server of FIG. 28.

FIG. 30 is a block diagram showing the internal construction of the service provider server 2830 of FIG. 28. As shown in FIG. 30, the service provider server 2830 includes a barcode generating unit 2831, a code distribution unit 2832, a barcode image analyzing unit 2833, a code information analyzing unit 2835, a transmitting/receiving unit 2836, a product information database managing unit 2837 and a control unit 2834.

The barcode generating unit 2831 is adapted to generate the barcode 60 including user information and billing information. The barcode generating unit 2831 generates the code information by coding the user information and the billing information, and then generates a barcode image corresponding to the code information. In this case, the billing information includes a billing item, billing amount billing term and etc.

The code distribution unit 2832, adapted to analyze a service identifier 3201 included in the payment request message 3200 received from the user terminal 10 to classify service types, analyzes the service identifier 3201, recognizes that the service type is a payment service, and transmits the barcode image to the barcode image analyzing unit 2833 if the received product information includes the barcode image.

The barcode image analyzing unit 2833 is adapted to receive the barcode image 3205 photographed by a photographing unit 11, extract code information from the barcode image and transmit the code information to the code information analyzing unit 2835, in a case where a decoder 13 for decoding the barcode 60 is not provided in the predetermined terminal 30.

The code information analyzing unit 2835 functions to analyze the code information received from the barcode image analyzing unit 2833 and extract the user information and the billing information from the analyzed code information.

And, the code information analyzing unit 2835 compares the extracted billing information with the billing information extracted from a billing information database 2840, and checks if the both are same.

The transmitting/receiving unit 2836 functions to receive/transmit data related to the barcode issue request message and the payment processing from/to the user terminal 10. That is, the transmitting/receiving unit 2836 receives the barcode issue request message from user terminal 10 and transmits the barcode 60 generated in corresponding to the barcode issue request message to the user terminal 10.

The billing information database managing unit 2837 functions to manage the billing information database 2840 for storing the user information and the billing information.

The control unit 2834 is adapted to control the respective components, and operated to generate a barcode generating control signal for generating the barcode corresponding to the received barcode issue request message, transmits the barcode generating control signal to the barcode generating unit 2831, generates a barcode image analyzing control signal and transmits the barcode image analyzing control signal to the barcode image analyzing unit 2833, if the barcode image 3205 is transmitted from the user terminal 10.

In the present embodiment, the barcode image analyzing unit 2833 is separate from the code information analyzing unit 2835. But, it's possible that the barcode image analyzing unit 2833 has a function that analyze the code information by unifying the both functions.

The detail construction of the user terminal 10 is same as described above in relation to FIG. 3. But, the decoder 13 functions to analyze the barcode image received from the photographing unit 11 and to extract the billing information. In case that the user terminal 10 does not include the decoder 13, the service provider server 2830 should have means for decoding the barcode. The user interface unit 17 functions to provide the user interface so as to allow the user to access the service provider server 2830 and to transmit the barcode issue request message and the payment request message.

The transmitting/receiving unit 19 functions to transmit the barcode issue request message and the payment request message to the service provider server 2830.

Figure 31:
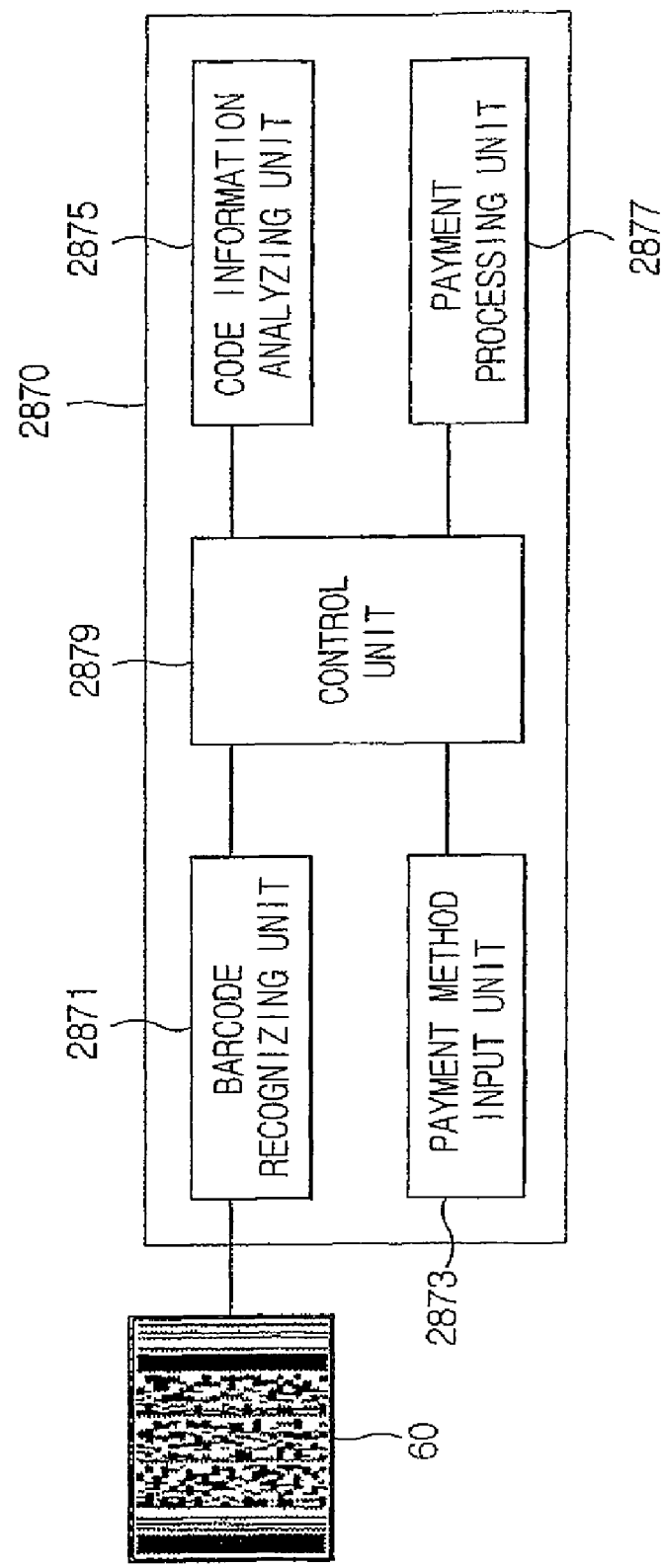
FIG. 31 is a block diagram showing the internal construction of the payment processing apparatus 2870.

FIG. 31 is a block diagram showing the internal construction of the payment processing apparatus 2870. As shown in FIG. 31, the payment processing apparatus 2870 includes a barcode recognizing unit 2871, a payment method input unit 2873, a code information analyzing unit 2875, a payment processing unit 2876 and a control unit 2879.

The barcode recognizing unit 2871 is adapted to analyze the code pattern image displayed on the user terminal screen and extract the code information corresponding to code pattern image. The barcode recognizing unit 2871 may be a barcode reader or camera. In other words, if the user displays the barcode 60 stored in the user terminal 10 on screen and move the screen to the barcode recognizing unit 2871, the barcode recognizing unit 2871 reads the barcode 60.

The payment method input unit 2873 is a part for inputting the payment method information of the user. The user's payment method may be, for example, credit card, debit card, account book, cash, etc, Common card or account book entrance of ATM can be used as the payment method input unit 2873.

The code information analyzing unit 2875 is a part that extracts the user information and the billing information included in the code information transmitted from the barcode recognizing unit 2871 and transmits the user information and the billing information to the payment processing unit 2877.

The payment processing unit 2877 is a part that process the payment transaction corresponding to the use information, billing information and payment method information received from the code information analyzing unit 2875.

The control unit 2879 is adapted to control the respective components, and generates a control signal for reading the code pattern image displayed on the user terminal screen to transmit the control signal to the barcode recognizing unit 2871, and generates a control signal for analyzing the code information to transmit the control signal to the code information analyzing unit 2875. Also, the control unit 2879 a payment processing control signal to the payment processing unit 2877 in order that the payment processing can be done.

Figure 32:
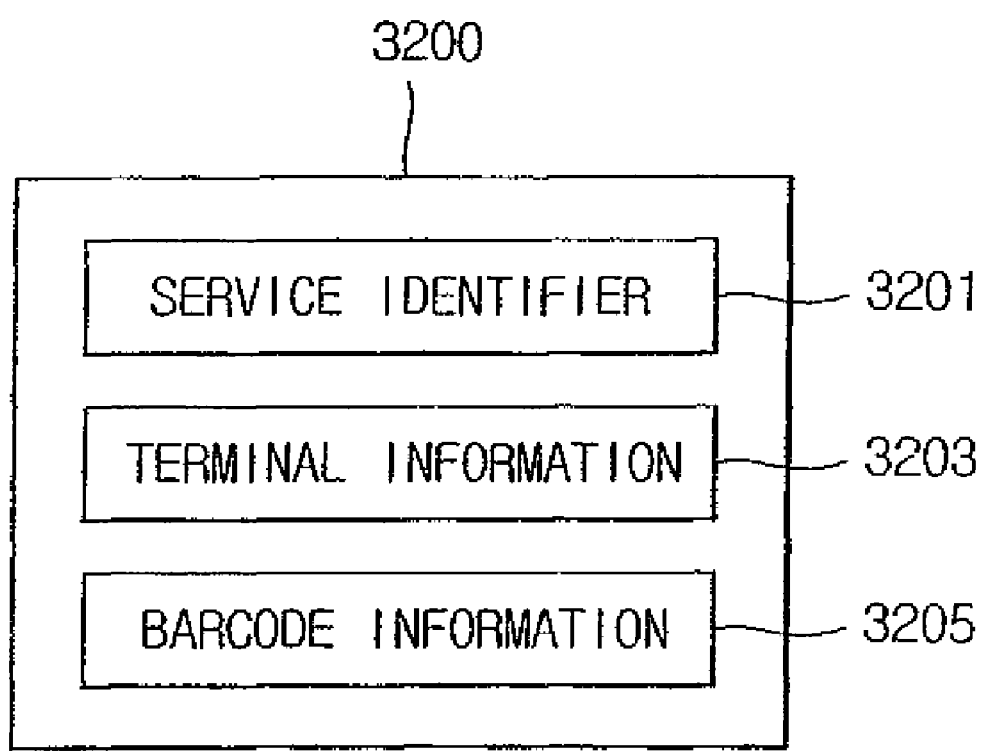
FIG. 32 is a view conceptually showing the data configuration of the payment request message 3200.

FIG. 32 is a view conceptually showing the data configuration of the payment request message 3200.

As shown in FIG. 32, in the payment request message 3200, a service identifier 3201, terminal information 3203 and barcode image 3205 are recorded.

The service identifier 2221 is a part in which a service type the service provider server 2830 should provide is recorded. The service provider server 2830 can provide a plurality of services, which can be provided using the barcode 60, such as the user contact information providing service, the taxi call service, the advertising service, the product information providing service, the payment service, etc. For example, four bits are allocated to the service identifier 3201, so that 0001, 0010, 0011, 0100 and 0101 can be used as identifiers to represent the taxi call service, the advertising service, the product information providing service, and the payment service, respectively. So, the service identifier 3201 in this embodiment may be 0101. In this case, the number of bits allocated to the service identifier 3201 can be properly changed depending on the types of services which the service provider server 2830 provides or if necessary.

The terminal information 3203 is the phone number of the user terminal 10. The barcode image 3205 is obtained by photographing the barcode 60 by the photographing unit 11 and by converting the photographed barcode 60 into digital image data. As described above, the barcode image 3205 is required when the user terminal 10 is not provided with the decoder 13, while it is not required when the user terminal is provided with the decoder 13.

Figure 33:
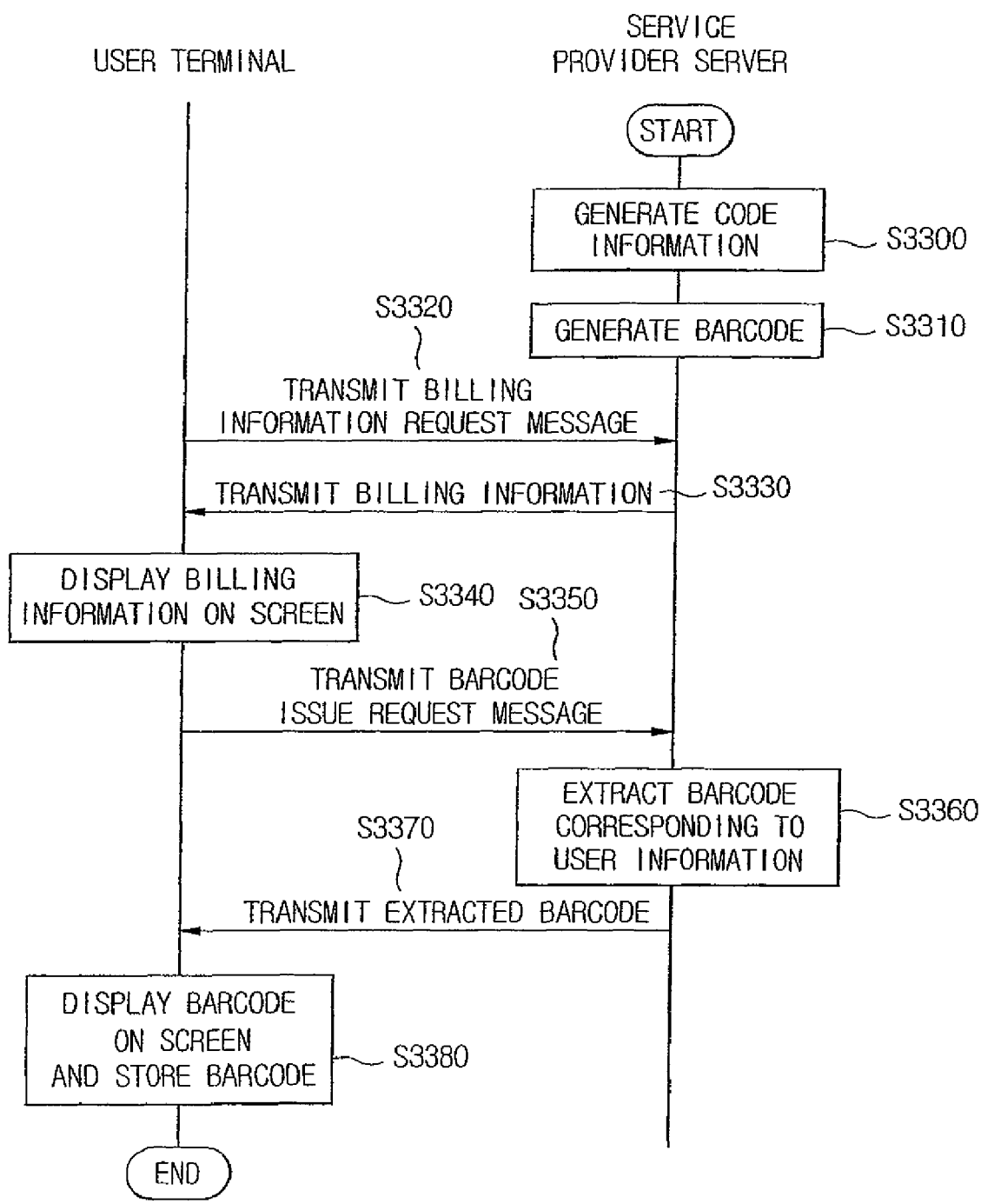
FIG. 33 is a flowchart of a code pattern, in which billing information is recorded, issue procedure.

FIG. 33 is a flowchart of a code pattern, in which billing information is recorded, issue procedure.

The service provider server 2830 generates the code information including payer information and billing information corresponding to the payer at step S3300, and generates the barcode 60 corresponding to the code information at step S3310.

If the payer who has to pay charge accesses the service provider server 2830 through the user terminal 10 to know billing amount and payment term and transmit billing request message to the service provider server 2830 at step S3320, the service provider server 2830 extracts the billing amount and payment term from the billing database to transmit the billing amount and payment term to the user terminal 10.

The user, who checked the billing amount and payment term, transmits barcode issue request message to the service provider server 2830 through the user terminal 10 at step S3350.

The service provider server 2830 extracts the barcode 60 from the billing database 2840 based on the received barcode issue request message and transmits the extracted barcode 60 to the user terminal 10 at step S3360, S3370.

If the user terminal 10 receives the barcode 60 from the service provider server 2830, the user terminal 10 displays the barcode 60 on screen and stores the received barcode in memory at step S3380.

In this embodiment, the service provider server 2830 generates the barcode 60 and extracts the barcode 60 to transmit to the user terminal 10 in response of the request from the user terminal 10. However, it is clearly possible that after receiving the barcode issue request message from the user terminal 10, the service provider server 2830 generates the barcode 60 in response of the barcode issue request message. Also, it is clearly possible that service provider server 2830 receives the barcode generated by a code issue server and transmits the barcode 60 to the user terminal 10, not generating the barcode 60 directly.

Payment service procedure using code pattern according to respective embodiment of the present invention is described below.

Figure 34:
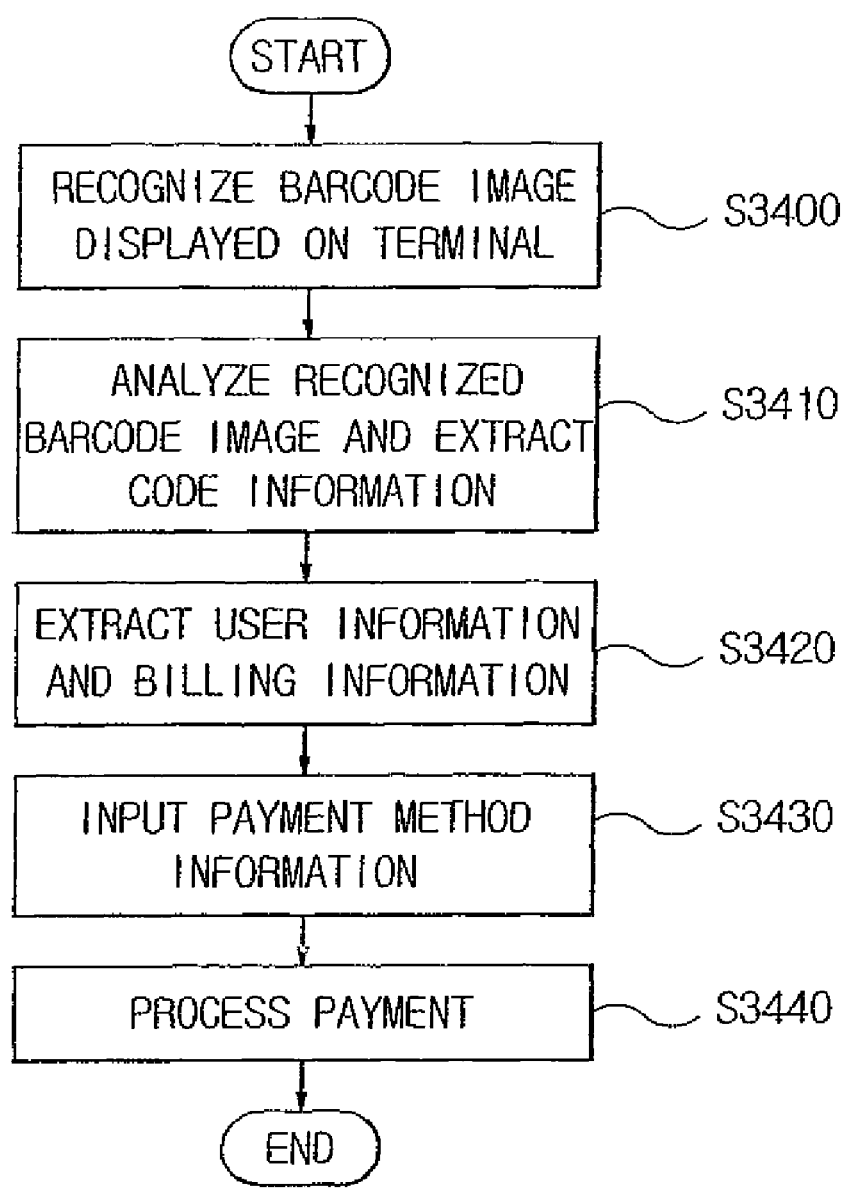
FIG. 34 is a flowchart of a method of providing payment service using code pattern according to an eleventh embodiment of the present invention.

FIG. 34 is a flowchart of a method of providing payment service using code pattern according to a eleventh embodiment of the present invention. The method shown in FIG. 34 is a case that payment transaction is processed by the payment processing unit 2870.

First, the barcode recognizing unit 2871, located in one side of the payment processing unit 2870, reads the barcodes 60 displayed on the user terminal screen at step S3400. In other words, the user display the barcode 60, received from the service provider server 2830 shown in FIG. 33 and stored, on the user terminal screen, and moves the screen to the barcode recognizing unit 2871 located in one side of the payment processing apparatus 2870, such as ATM in bank. If so, the barcode recognizing unit 2871 scans or photographs the barcode, and analyzes the barcode 60 to extract the code information from the barcode 60 at step S3410.

The code information analyzing unit 2875 provided in the payment processing apparatus 2870 analyzes the code information and extracts the user information and billing information from the code information to transmit the user information and billing information to payment processing unit 2877 at step S3420.

Next, receiving the payment method, that is means for paying a bill such as credit card, account book, cash etc, from the user, the payment method input unit 2873 of the payment processing apparatus 2870 transmits the input payment information to the payment processing unit 2877 at step S3430.

The payment processing unit 2877 processes the payment transaction based on the received use information, billing information and payment method information at step S3440.

The payment processing procedure is done as same as a conventional procedure in case of transferring money between different accounts by inputting a card or an account book into ATM. The conventional procedure is well known to those skilled in the art. So the description abut the payment processing procedure is omitted.

Figure 35:
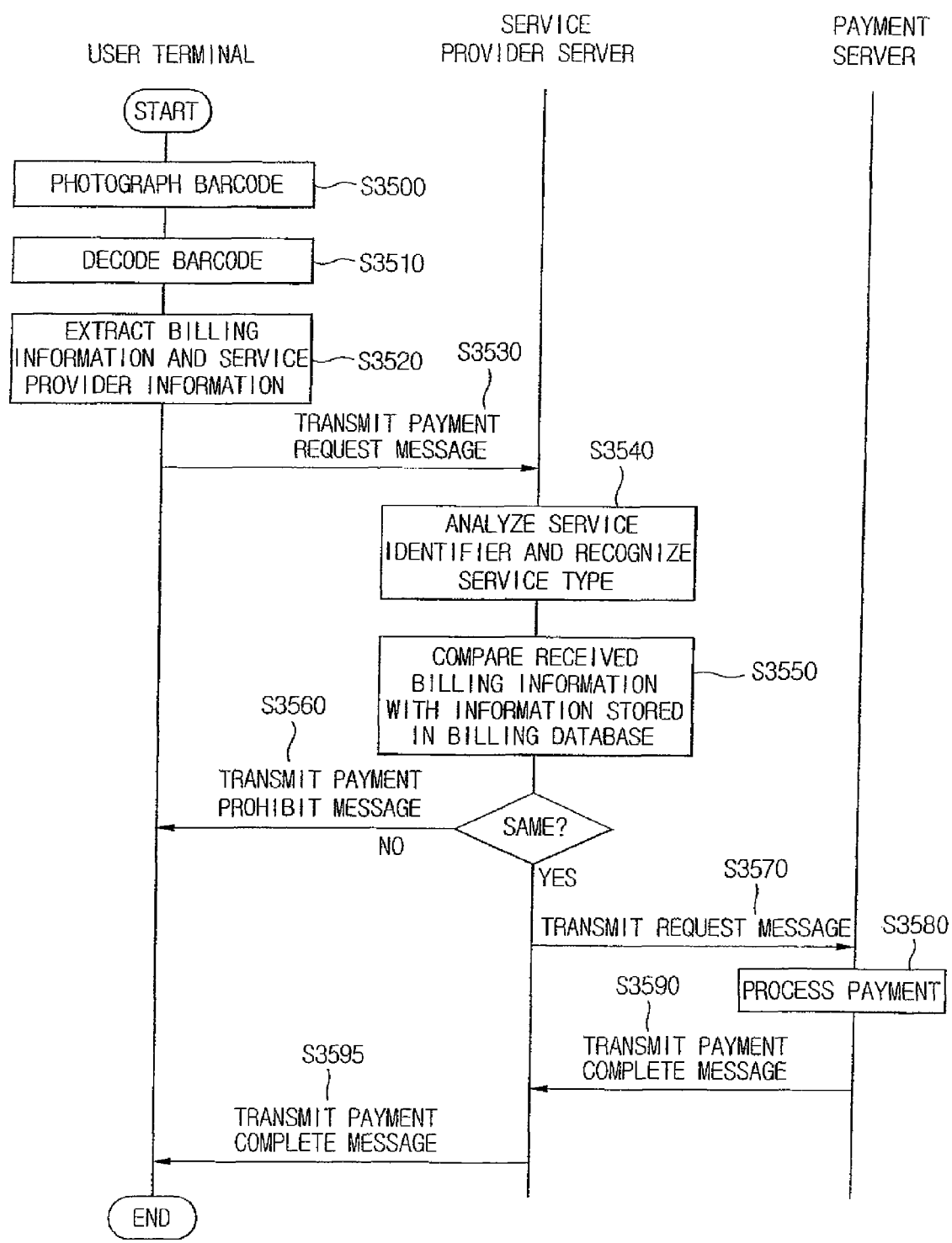
FIG. 35 is a flowchart of a method of paying a bill using code pattern according to a twelfth embodiment of the present invention.

FIG. 35 is a flowchart of a method of paying a bill using code pattern according to a twelfth embodiment of the present invention. The twelfth embodiment of the present invention is a case that the decoder 13 is included in the user terminal 10.

First, the user terminal 10 photographs the barcode 60 recorded in one side of GIRO paper at step S3500. For example, the user photographs the barcode part of GIRO paper using the photographing unit 11, such as a camera provided in the terminal, by pressing a photographing button after selecting a barcode menu on the user terminal 10.

The decoder 13 provided in the user terminal 10 decodes the photographed barcode image and extracts the code information at step S3510, and then extracts the billing information and service provider server information from the code information at step S3520.

The user terminal 10 accesses the service provider server 2830 based on the extracted service provider server information and transmits the payment request message 3200 to the service provider server 2830 at steps S3530.

The service provider server 2830 analyzes a service identifier 3201 included in the received payment request message and recognizes the service type at step S35400. That is, the code distribution unit 2832 in the service provider server 2830 recognizes that a service type is the payment service by analyzing the service identifier 3201, and notifies the fact that the service type is the payment service to the control unit 2834.

The control unit 2834 of the service provider server 2830 checks whether the billing information received from the user terminal 10 and the billing information stored in the billing information database are same or not at step S3550.

If the both are not same, the service provider server 2830 transmits a payment prohibition message to the user terminal 10 at step S3560. If the both are same, the service provider server 2830 transmits a payment request message including the user information and billing information to the payment server 2880 at step S3570.

Finally, the payment server 2880 processes the corresponding payment transaction based on the received payment request message at step S3580, and transmits a payment completion message to the service provider server 2830 at step S3590, if the payment transaction is done. The service provider server 2830 transmits the payment completion message to the user terminal 10 at step S3595.

Figure 36:
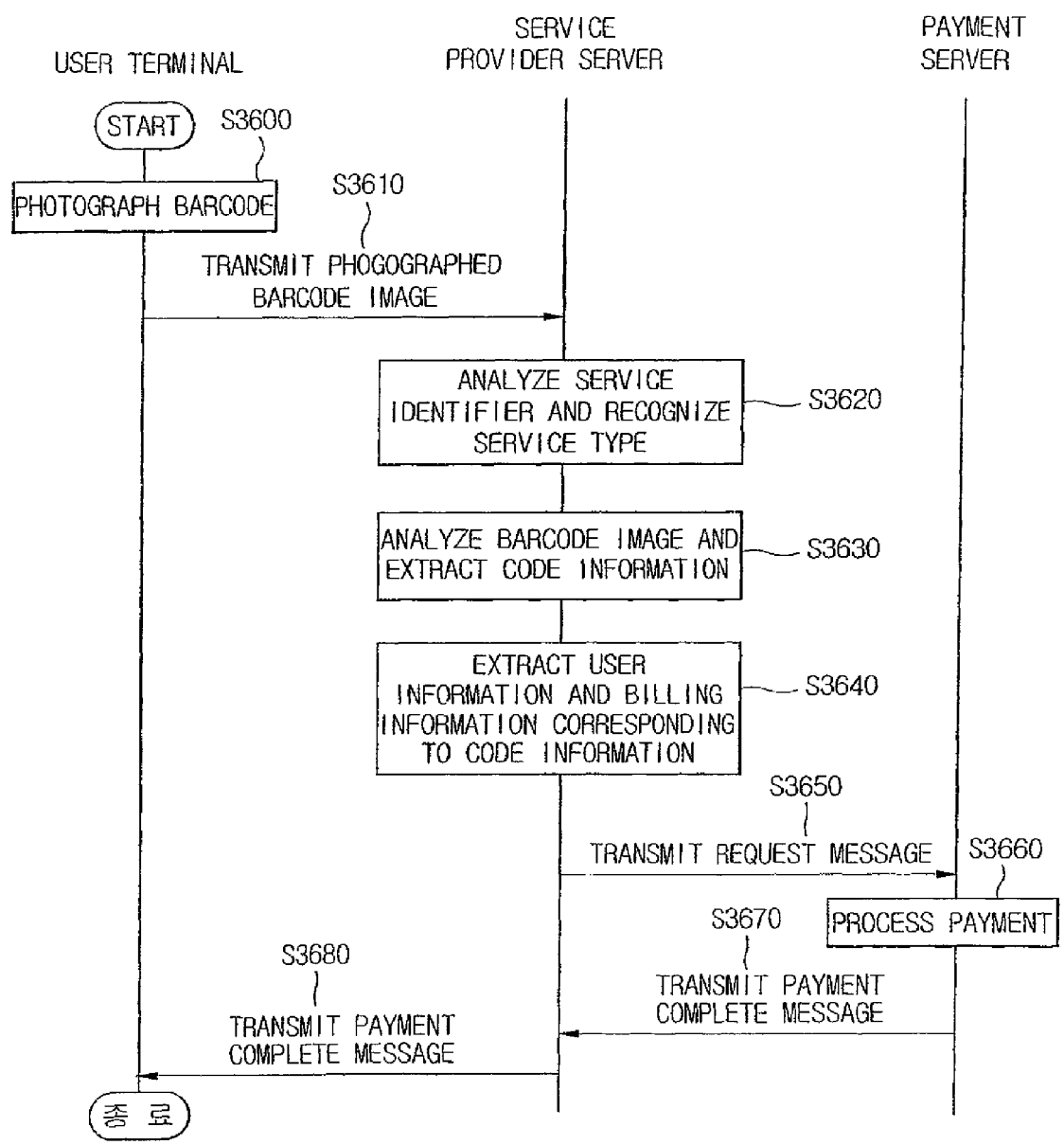
FIG. 36 is a flowchart of a method of paying a bill using code pattern according to a thirteenth embodiment of the present invention.

FIG. 36 is a flowchart of a method of paying a bill using code pattern according to a thirteenth embodiment of the present invention. The thirteenth embodiment of the present invention is a case that the decoder 13 is not included in the user terminal 10.

First, the user terminal 10 photographs the barcode 60 recorded in one side of GIRO paper at step S3600. For example, the user photographs the barcode part of GIRO paper using the photographing unit 11, such as a camera provided in the terminal, by pressing a photographing button after selecting a barcode menu on the user terminal 10.

The user terminal 10 transmits the payment request message including the photographed barcode image to the service provider server 2830 at step S3610.

The service provider server 2830 analyzes a service identifier 3201 included in the received payment request message and recognizes the service type at step S3620. That is, the code distribution unit 2832 of the service provider server 2830 recognizes that a service type is the payment service by analyzing the service identifier 3201, and transmits the barcode image 3205 included in the received payment request message to the barcode image analyzing unit 2833.

The barcode image analyzing unit 2833 analyzes the received barcode image 3205 to extract code information and transmit the code information to the code information analyzing unit 2835 at step S3630.

The code information analyzing unit 2835 analyzes the received code information and extract the user information and the billing information corresponding to the code information at step S3640. In other words, the code information analyzing unit 2835 extracts the user information and billing information corresponding to the received code information from the billing information database 2840 in reference with the billing database 2840

The service provider server 2830 transmits a payment request message including the extracted user information and billing information to the payment server at step S3650.

Finally, the payment server 2880 processes the corresponding payment transaction based on the received payment request message at step S3660, and transmits a payment completion message to the service provider server 2830 at step S3670, if the payment transaction is done. The service provider server 2830 transmits the payment completion message to the user terminal 10 at step S3680.

In these embodiments, it has been described for an example of mobile phone using wireless communication network. However, it is possible to be provided with the product information providing service described above, using wire/wireless phone or public phone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

According to one embodiment of the present invention, by using mobile terminal having camera and code pattern having information, a various and convenient mobile additional service can be provided to mobile terminal user.

Concretely, the method for providing content using barcode can be provided, which makes user connect to internet site and buy the product by making mobile terminal read barcode which has information of internet site about product advertisement.

Also, in one embodiment of the present invention, the method for providing content using barcode can be provided, which makes mobile terminal get directly the data in printed matter and the multi media data information by reading the barcode in said printed matter.

In one embodiment, the method for providing content using barcode can be provided, which makes mobile terminal get directly various web page information related to the data in printed matter and the multi media data information by reading the barcode in said printed matter.

In one embodiment, the method for providing content using barcode can be provided, which is useful in the usual mobile terminal.

In one embodiment, the method and apparatus for providing geographical information using code pattern can be provided, which makes user get the tourist resort information by taking picture of and decoding the code pattern recorded in special tourist resort information of tour guidebook and connecting with the web site providing tourist resort information.

In one embodiment, the method and apparatus for providing geographical information using code pattern can be provided, which makers user get the local information by taking picture of and decoding the code pattern recorded in local directional sign and connecting with the web site providing the local information.

In one embodiment, the method and apparatus for providing geographical information using code pattern can be provided, which makes user find geographical information easily through finding geographical information using code pattern which need to input or remember the details of web site URL.

In one embodiment, the method and apparatus for providing geographical information using code pattern can be provided, which makes user get geographical information service without the component for decoding code pattern in mobile terminal, by makes mobile terminal transfer the code pattern image taken picture of code pattern to service provider server and get the according geographical information from service provider server.

In one embodiment, the method for providing taxi call service using code pattern can be provided, which makes user call taxi easily in spite of knowing the telephone number of transfer businessman or web site URL by reading code pattern having transfer service provider server information and transferring taxi call message to service provider server or transfer service provider server.

In one embodiment, the method for providing taxi call service using code pattern can be provided, which calls taxi in a short time by making service provider server or transfer service provider server receiving taxi call message from user terminal call the nearest taxi from the user.

In one embodiment, the method for providing personal connection information using barcode can be provided, which is useful in usual mobile terminal by using the camera attached to the usual mobile terminal, not using additional barcode reader.

In one embodiment, the method and apparatus for providing personal connection information using barcode can be provided, which is useful in on-line by getting barcode having the user contact information through internet and in off-line by printing barcode and attach it to business card.

In one embodiment, the method and apparatus for providing personal connection information using barcode can be provided, which simplifies the program for reading barcodes in mobile terminal and can use limited memory in mobile terminal effectively, by making the mobile terminal find only code information from the barcode and get user connection information according to code information from service provider server.

In one embodiment the method and apparatus for providing personal connection information using barcode can be provided, which makes user get contact information service without the component for reading barcode in mobile terminal, by makes mobile terminal transfer the image data taken picture of barcode to service provider server and get the according user connection information from service provider server.

In one embodiment, the method and apparatus for payment using code pattern can be provided, which can pay charges easily, by making mobile terminal get code pattern having payment information through mobile internet and by making code pattern reader in bank scan it.

In one embodiment, the method and apparatus for payment using code pattern can be provided, which has no need to have giro paper and no danger to lose it, by payment using code pattern.

In one embodiment, the method and apparatus for payment using code pattern can be provided, which can pay charges in mobile internet, by making terminal take picture of code pattern attached to giro paper and transfer it to service provider server.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of providing a transportation call service with the use of a code pattern, the method comprising:

receiving a transportation call message including code information from a user terminal, wherein the code information is obtained by reading a code pattern located at and corresponding to a specific region, and wherein the code pattern includes a service identifier for indicating a service type and location information for the specific region;

obtaining the service identifier and the location information regarding the specific region from the code information; and obtaining information for at least one transportation service provider server corresponding to the service identifier;

transmitting the call message, including the location information for the specific region, to the at least one transportation service provider server, wherein the at least one transportation service provider server detects present location information of transportation vehicles, which belong to the transportation service provider, and transmits the call message to a nearest transportation vehicle located from the specific region.

2. The method of claim 1, wherein there are a plurality of transportation service providers, the method further comprising:

receiving a transportation call acknowledgement message from one of the plurality of transportation service provider servers; and transmitting a transportation call cancel message to the remaining transportation service provider servers.

3. The method of claim 2, further comprising:

performing a billing process for charging predetermined fees to the transportation service provider server which transmitted the taxi call acknowledgement message.

4. The method of claim 1, wherein the code pattern further comprises information regarding the transportation service provider server, and wherein the transmitting comprises transmitting the transportation call message, corresponding to the transportation service provider server information obtained from the code pattern, to the transportation service provider server.

5. The method of claim 1, wherein the information regarding the transportation service provider server is a website address of the transportation service provider server.

6. The method of claim 1, wherein the code pattern is contained in a tourist guidebook or located at a regional transportation guideboard.

7. A method of providing a transportation call service with the use of a code pattern, the method comprising:
receiving a transportation call message including code information from a user terminal, wherein the code information is obtained by reading a code pattern located at and corresponding to a specific region, and wherein the code pattern includes a service identifier for indicating a service type and location information for the specific region;
obtaining the service identifier and the location information regarding the specific region from the code information;
obtaining present location information of transportation vehicles located in a predetermined distance from the specific region; and
detecting a nearest transportation vehicle located from the specific region and transmitting the transportation call message to the nearest vehicle.

8. The method of claim 7, wherein the code pattern is contained in a tourist guidebook or located at a regional transportation guideboard.

9. A method of providing a transportation call service with the use of a code pattern, the method comprising:
receiving a transportation call message including code information from a user terminal, wherein the code information is obtained by reading a code pattern located at and corresponding to a specific region, and wherein the code pattern includes a service identifier for indicating a service type and location information for the specific region;
analyzing the service identifier and recognizing that the service type is a transportation call service;
obtaining location information for the specific region location and information regarding a transportation service provider server corresponding to the code information; and
transmitting the location information and the provider server information to the user terminal,
wherein if the user terminal transmits a transportation call message including the location information for the specific region to the transportation service provider server, the transportation service provider server detects present location information of transportation vehicles which belong to the transportation service provider and transmits a transportation call message to a nearest transportation vehicle located from the specific region.

10. The method of claim 9, further comprising:
receiving a transportation call acknowledgement message from the transportation service provider server; and
transmitting the received call acknowledgement message to the user terminal.

11. The method of claim 10, wherein the transportation call acknowledgement message comprises scheduled arrival time information.

12. The method of claim 9, wherein the code pattern is contained in a tourist guidebook or located at a regional transportation guideboard.

13. A method of calling transportation with the use of a code pattern in a user terminal, the method comprising:
reading a code pattern located at and corresponding to a specific region so as to obtain code information, wherein the code pattern comprises location information for the specific region and information regarding a transportation service provider server;
obtaining the location information and the provider server information from the code information; and
transmitting a transportation call message, including the region information, to the transportation service provider server,
wherein the transportation service provider server detects present location information of transportation vehicles which belong to the transportation service provider and transmits the transportation call message to a nearest transportation vehicle located from the specific region.

14. The method of claim 13, wherein the code pattern is contained in a tourist guidebook or located at a regional transportation guideboard.

15. A method of calling transportation with the use of a code pattern in a user terminal, the method comprising:
reading a code pattern located at and corresponding to a specific region so as to obtain code information, wherein the code pattern comprises location information for the specific region and information regarding a transportation service provider server;
transmitting the obtained code information to a service provider server;
receiving the location information and the service provider server information; and
transmitting a transportation call message, including the region information, to the transportation service provider server,
wherein the transportation service provider server detects present location information of transportation vehicles which belong to the transportation service provider and transmits the call message to a nearest transportation vehicle located from the specific region.

16. The method of claim 15, further comprising:
receiving a transportation call acknowledgement message from at least one of the transportation vehicles and the transportation service provider server.

17. The method of claim 16, wherein the transportation call acknowledgement message comprises scheduled arrival time information.

18. The method of claim 15, wherein the transportation provider server information is a website address of the transportation service provider server.

19. The method of claim 15, wherein the code pattern is contained in a tourist guidebook or located at a regional transportation guideboard.

* * * * *